(12) United States Patent
Sakurai

(10) Patent No.: US 11,572,002 B2
(45) Date of Patent: Feb. 7, 2023

(54) VEHICLE ENTRY-EXIT ASSIST DEVICE

(71) Applicant: TOYOTA JIDOSHA KABUSHIKI KAISHA, Aichi-ken (JP)

(72) Inventor: Hideyuki Sakurai, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 551 days.

(21) Appl. No.: 16/595,828

(22) Filed: Oct. 8, 2019

(65) Prior Publication Data
US 2020/0114797 A1   Apr. 16, 2020

(30) Foreign Application Priority Data

Oct. 16, 2018 (JP) .............................. JP2018-195386
Nov. 20, 2018 (JP) .............................. JP2018-217716

(51) Int. Cl.
*B60N 3/02* (2006.01)
*E05F 15/655* (2015.01)

(52) U.S. Cl.
CPC ............ *B60N 3/023* (2013.01); *E05F 15/655* (2015.01); *E05Y 2900/531* (2013.01)

(58) Field of Classification Search
CPC .... B60N 3/023; B60N 3/026; B60R 21/0273; B60R 21/02; B60R 2021/0273
USPC ...................................................... 296/1.02
See application file for complete search history.

(56) References Cited

U.S. PATENT DOCUMENTS

| | | | | |
|---|---|---|---|---|
| 6,974,134 | B1* | 12/2005 | Macri | E05B 1/0015 16/412 |
| 7,744,141 | B2* | 6/2010 | Saionji | B60N 3/023 49/461 |
| 2003/0226240 | A1* | 12/2003 | Belchine, III | B60N 3/023 16/438 |
| 2007/0204437 | A1* | 9/2007 | Hartmann | B60N 3/023 16/444 |
| 2008/0216285 | A1* | 9/2008 | Browne | B60N 3/023 16/110.1 |
| 2009/0243319 | A1* | 10/2009 | Browne | B60N 3/023 296/1.02 |
| 2017/0182919 | A1* | 6/2017 | McKinnon | B60N 3/026 |

(Continued)

FOREIGN PATENT DOCUMENTS

| | | |
|---|---|---|
| CN | 1373718 A | 10/2002 |
| CN | 107719084 A | 2/2018 |

(Continued)

*Primary Examiner* — D Glenn Dayoan
*Assistant Examiner* — Kevin P Weldon
(74) *Attorney, Agent, or Firm* — Hauptman Ham, LLP

(57) ABSTRACT

A vehicle entry-exit assist device includes a support column that is provided along a vehicle vertical direction at a vehicle inner side of an a vehicle front side end portion or a vehicle rear side end portion of a door opening provided at a side section of a vehicle so as to place the vehicle inner side and a vehicle outer side in communication with each other, a handrail that is provided to the support column, that is capable of pivoting toward the vehicle outer side and a vehicle upper side about an axis along a vehicle front-rear direction in a case in which a door provided at the door opening is open, and that is stowed along the support column in a case in which the door is closed, and a pivot mechanism that is provided at the support column and that is configured to pivot the handrail.

8 Claims, 20 Drawing Sheets

(56) References Cited

U.S. PATENT DOCUMENTS

| | | | |
|---|---|---|---|
| 2017/0320420 A1* | 11/2017 | Logan, Jr. | B60J 5/0493 |
| 2018/0044956 A1 | 2/2018 | Gerhardt et al. | |
| 2021/0162905 A1* | 6/2021 | Song | B60N 3/026 |

FOREIGN PATENT DOCUMENTS

| | | | |
|---|---|---|---|
| JP | H08-118958 A | 5/1996 | |
| JP | H8282353 A | 10/1996 | |
| JP | 2018-069955 A | 5/2018 | |
| JP | 2018144584 A | 9/2018 | |
| WO | 0119642 A2 | 3/2001 | |

* cited by examiner

VEHICLE ENTRY-EXIT ASSIST DEVICE

CROSS-REFERENCE TO RELATED APPLICATION

This application is based on and claims priority under 35 USC 119 from Japanese Patent Application No. 2018-195386 filed on Oct. 16, 2018 and Japanese Patent Application No. 2018-217716 filed on Nov. 20, 2018, the disclosures of which are incorporated by reference herein.

BACKGROUND

Technical Field

The present invention relates to a vehicle entry-exit assist device.

Related Art

Japanese Patent Application Laid-Open (JP-A) No. H08-118958 discloses a vehicle swing door support device including a support arm with one end pivotably attached to a swing door that moves along an outer face of a vehicle when an entry-exit opening of the vehicle is being opened up, and another end pivotabily attached to the vehicle in the vicinity of the entry-exit opening. The support arm is provided with a stay that projects out from a side portion of the entry-exit opening in an open state of the swing door so as to serve as a handrail at the vehicle exterior, and that is prevented from intruding into the entry-exit opening in a closed state of the swing door.

However, in the vehicle swing door support device described in JP-A No. H08-118958, the support arm and the stay are rotated and moved into the cabin when the swing door is in the closed state. A space for an occupant inside the vehicle is thereby reduced by the support arm and the stay that have been moved into the cabin. There is accordingly demand for a vehicle entry-exit assist device capable of facilitating entry or exit of an occupant when a door is open, and also capable of securing space inside the vehicle for the occupant in a case in which the door is closed.

SUMMARY

In consideration of the above circumstances, an object of the present invention is to obtain a vehicle entry-exit assist device capable of facilitating entry or exit for an occupant when a door is open, and also capable of securing space inside the vehicle for the occupant in a case in which the door is closed.

A vehicle entry-exit assist device of a first aspect of the present invention includes: a support column that is provided along a vehicle vertical direction at a vehicle inner side of a vehicle front side end portion or a vehicle rear side end portion of a door opening provided at a side section of a vehicle so as to place the vehicle inner side and a vehicle outer side in communication with each other; a handrail that is provided to the support column, that is capable of pivoting toward the vehicle outer side and a vehicle upper side about an axis along a vehicle front-rear direction in a case in which a door provided at the door opening is open, and that is stowed along the support column in a case in which the door is closed; and a pivot mechanism that is provided to the support column and that is configured to pivot the handrail.

According to the vehicle entry-exit assist device of the first aspect of the present invention, the handrail is provided to the support column, is capable of being pivoted by the pivot mechanism toward the vehicle outer side and the vehicle upper side about an axis along the vehicle front-rear direction in a case in which the door is open, and is stowed along the support column in a case in which the door is closed. This enables an occupant to hold onto the handrail that has pivoted toward the vehicle outer side and the vehicle upper side in a case in which the door is open, thus facilitating entry and exit of the vehicle. When the door is closed, the handrail is stowed along the support column provided along the vehicle vertical direction at the vehicle inner side of the vehicle front side end portion or the vehicle rear side end portion of the door opening, enabling a vehicle interior space for the occupant to be secured.

A vehicle entry-exit assist device of a second aspect of the present invention includes: a pivot mechanism that is provided at a vehicle inner side edge of a vehicle front side end portion or a vehicle rear side end portion of a door opening provided at a side section of a vehicle so as to place the vehicle inner side and a vehicle outer side in communication with each other, and that includes a drive shaft capable of rotating about an axis along a vehicle front-rear direction; and a handrail that is attached to the drive shaft, that is capable of pivoting toward the vehicle outer side and a vehicle upper side about an axis along the vehicle front-rear direction in a case in which a door provided at the door opening is open, and that is stowed along a vehicle vertical direction at the vehicle inner side in a case in which the door is closed.

According to the vehicle entry-exit assist device of the second aspect of the present invention, the vehicle entry-exit assist device is configured simply by attaching the handrail to the pivot mechanism provided at the vehicle inner side edge of the door opening such that the handrail is capable of pivoting about an axis along the vehicle front-rear direction. Accordingly, the only member that causes a reduction in a vehicle interior space for an occupant when the door is closed is the handrail that is stowed along the vehicle vertical direction at the vehicle inner side. This suppresses a reduction in the vehicle interior space for the occupant in a case in which the door is closed, enabling even more vehicle interior space for the occupant to be secured.

A vehicle entry-exit assist device of a third aspect of the present invention is the vehicle entry-exit assist device of the first aspect, wherein the pivot mechanism is driven by an opening-closing mechanism of the door so as to pivot the handrail in conjunction with opening and closing of the door.

According to the vehicle entry-exit assist device of the third aspect of the present invention, the opening-closing mechanism of the door is used to drive the pivot mechanism, enabling the handrail to be made to pivot efficiently in conjunction with opening and closing of the door. This also enables an increase in cost associated with providing a drive device to be suppressed since there is no need to provide a drive device for the pivot mechanism.

A vehicle entry-exit assist device of a fourth aspect of the present invention is the vehicle entry-exit assist device of the first aspect, wherein the handrail includes: a dividing section that divides the handrail into a vehicle width direction inner side portion and a vehicle width direction outer side portion at an intermediate portion of the handrail while in an in-use state in which the handrail has been pivoted toward the vehicle outer side and the vehicle upper side; a first handrail portion that extends from the dividing section to a vehicle width direction inner side end portion of the handrail; a second handrail portion that extends from the dividing section to a vehicle width direction outer side end portion of the handrail, and that is coupled to the first handrail portion at the dividing section so as to be capable of pivoting toward the vehicle front side and the vehicle rear side about an axis along the vehicle vertical direction while in the in-use state; a sensor section that is provided along a length direction of the handrail at an upper face of the handrail while in the in-use state, and that is configured to detect gripping of the handrail by an occupant; and a restricting mechanism that operates in conjunction with the sensor section to restrict pivoting of the second handrail portion toward the vehicle front side and the vehicle rear side in a case in which gripping of the handrail by the occupant has been detected by the sensor section.

According to the vehicle entry-exit assist device of the fourth aspect of the present invention, the handrail is configured by the first handrail portion and the second handrail portion coupled to the first handrail portion so as to be capable of pivoting toward the vehicle front side and the vehicle rear side. Moreover, the sensor section is provided along a length direction of the handrail at the upper face of the handrail while in the in-use state, enabling gripping of the handrail by an occupant to be detected. The handrail is also provided with the restricting mechanism that operates in conjunction with the sensor section to restrict pivoting of the second handrail portion toward the vehicle front side and the vehicle rear side when the sensor section has detected gripping of the handrail by the occupant. This enables an occupant gripping the handrail in order to enter or exit the vehicle to grip the handrail steadily, thereby enabling the occupant to steady their posture when entering or exiting the vehicle.

Moreover, according to the vehicle entry-exit assist device of the fourth aspect of the present invention, the second handrail portion is not restricted from pivoting in a case in which gripping by an occupant is not being detected by the sensor section. Thus, if a pedestrian walking at the exterior of the vehicle or a bicycle passing by the exterior of the vehicle contacts the handrail while in the in-use state but not being gripped by an occupant, the second handrail portion pivots toward whichever out of the vehicle front side or vehicle rear side corresponds to the direction of progress of the pedestrian or the bicycle. This enables the impact from the handrail received by the pedestrian or the cyclist who has contacted the second handrail portion to be lessened, enabling an improvement in pedestrian and cyclist safety.

A vehicle entry-exit assist device of a fifth aspect of the present invention is the vehicle entry-exit assist device of the fourth aspect, wherein the sensor section includes an electrostatic sensor configured to detect a state in which a hand of the occupant has made contact with the upper face, or a state in which a hand of the occupant is proximate to the upper face.

According to the vehicle entry-exit assist device of the fifth aspect of the present invention, the sensor section includes an electrostatic sensor. This enables the hand of an occupant configuring a detection target to be detected over a wide detection range by detecting a change in electrostatic capacitance.

Advantageous Effects of Invention

As described above, the vehicle entry-exit assist device according to the present invention exhibits the excellent advantageous effects of being capable of facilitating entry and exit for an occupant in a case in which the door is open, and also being capable of securing space inside the vehicle for the occupant in a case in which the door is closed.

BRIEF DESCRIPTION OF THE DRAWINGS

Exemplary embodiments of the present invention will be described in detail based on the following figures, wherein.

DETAILED DESCRIPTION

Figure 1:
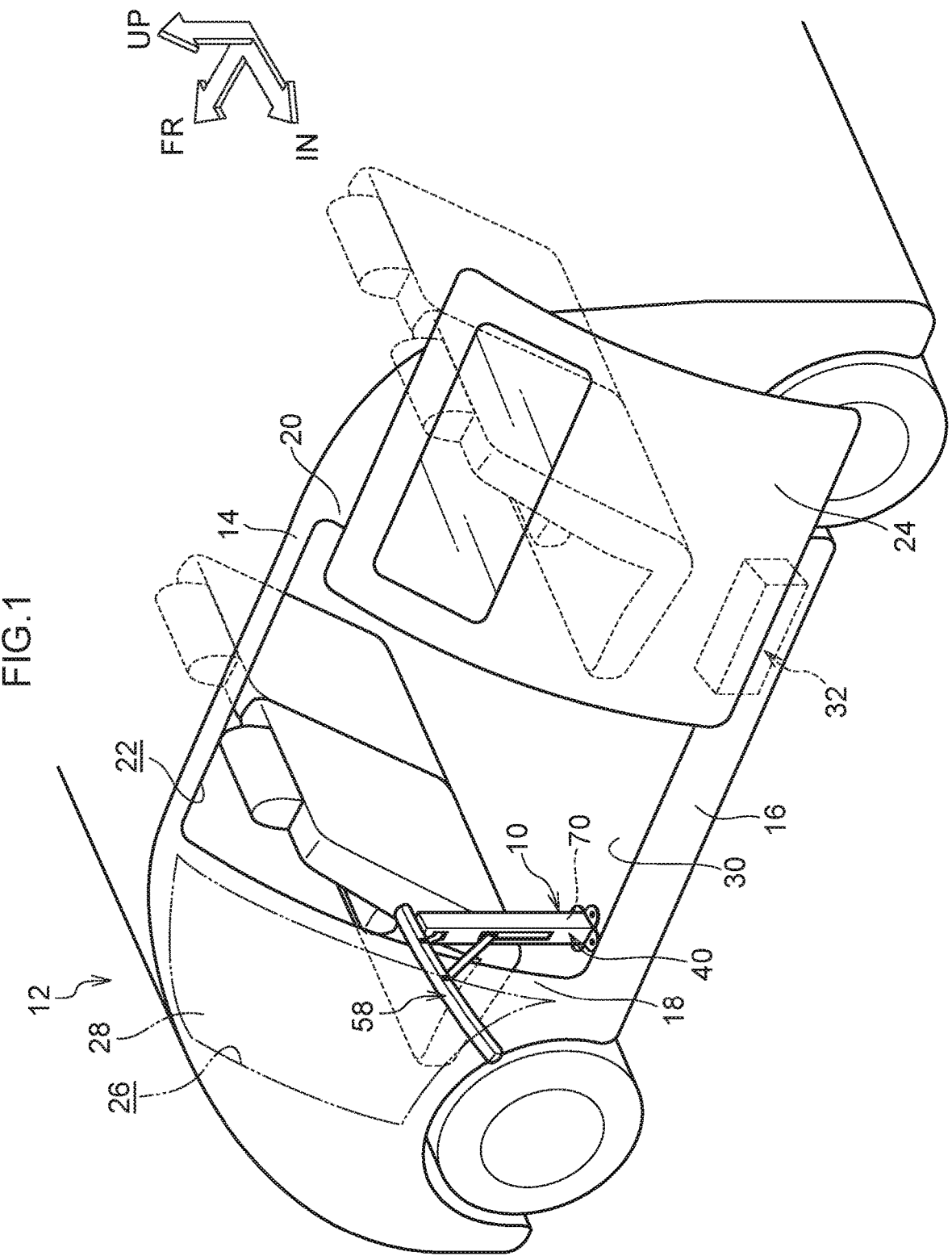
FIG. 1 is a perspective view illustrating a vehicle provided with a vehicle entry-exit assist device according to a first exemplary embodiment, as viewed from a rear-left side.

Explanation follows regarding a first exemplary embodiment of a vehicle entry-exit assist device according to the present invention, with reference to FIG. 1 to FIG. 6. Note that in the drawings, the arrow FR indicates a vehicle front side, the arrow UP indicates a vehicle upper side, and the arrow IN indicates a vehicle width direction inner side, as appropriate. Note that the vehicle right side is defined as a right hand direction and the vehicle left side is defined as a left hand direction when facing toward the vehicle front side.

FIG. 1 illustrates a vehicle 12 provided with a vehicle entry-exit assist device 10 as viewed from the rear-left side. A roof side rail 14 is disposed at an upper portion of a side section of the vehicle 12. The roof side rail 14 extends along the vehicle front-rear direction. A rocker 16 is disposed with its length direction along the vehicle front-rear direction at a lower portion of the side section of the vehicle 12. The rocker 16 is extended along its length direction. A center pillar 18 projects upward toward the vehicle upper side from a vehicle front side of the rocker 16. An upper end portion of the center pillar 18 is connected to a substantially vehicle front-rear direction intermediate portion of the roof side rail 14. At the vehicle rear side of the center pillar 18, a rear pillar 20 projects upward toward the vehicle upper side from the rocker 16. An upper end portion of the rear pillar 20 is connected to a rear end portion of the roof side rail 14.

The roof side rail 14, the rocker 16, the center pillar 18, and the rear pillar 20 each have a closed cross-section structure, and configure vehicle body framework members. A rear door opening 22, serving as a door opening surrounded by the vehicle body framework members including the roof side rail 14, the center pillar 18, the rocker 16, and the rear pillar 20, is formed in the side section of the vehicle 12. Namely, the roof side rail 14 is disposed along the vehicle front-rear direction at an upper edge of the rear door opening 22, and the rocker 16 is disposed along the vehicle front-rear direction at a lower edge of the rear door opening 22. The center pillar 18 is disposed along the vehicle vertical direction at a front edge of the rear door opening 22, and the rear pillar 20 is disposed along the vehicle vertical direction at a rear edge of the rear door opening 22.

The rear door opening 22 places the exterior and interior of a vehicle cabin in communication with each other, and is opened and closed by a sliding door 24, serving as a door. An opening weather strip (not illustrated in the drawings) is attached to peripheral edges of the rear door opening 22 around the entire periphery of the rear door opening 22. Note that although detailed description thereof is omitted, a front door opening 26 is formed toward the vehicle front side of the side section of the vehicle 12, and a front door 28 is provided to open and close the front door opening 26.

The sliding door 24 is moved toward the vehicle rear side to open up the rear door opening 22, and moved toward the vehicle front side to close off the rear door opening 22. An electric power unit 32, serving as an opening-closing mechanism to open and close the sliding door 24, is provided at a location to the vehicle lower and rear side of the rear door opening 22. The electric power unit 32 is configured including a motor, not illustrated in the drawings, a motor belt 34 (see FIG. 4), and plural rollers 36 (see FIG. 4). The motor belt 34 is coupled to the sliding door 24 through a bracket, not illustrated in the drawings. The motor belt 34 is driven by actuation of the motor, causing the sliding door 24 to slide.

Figure 2:
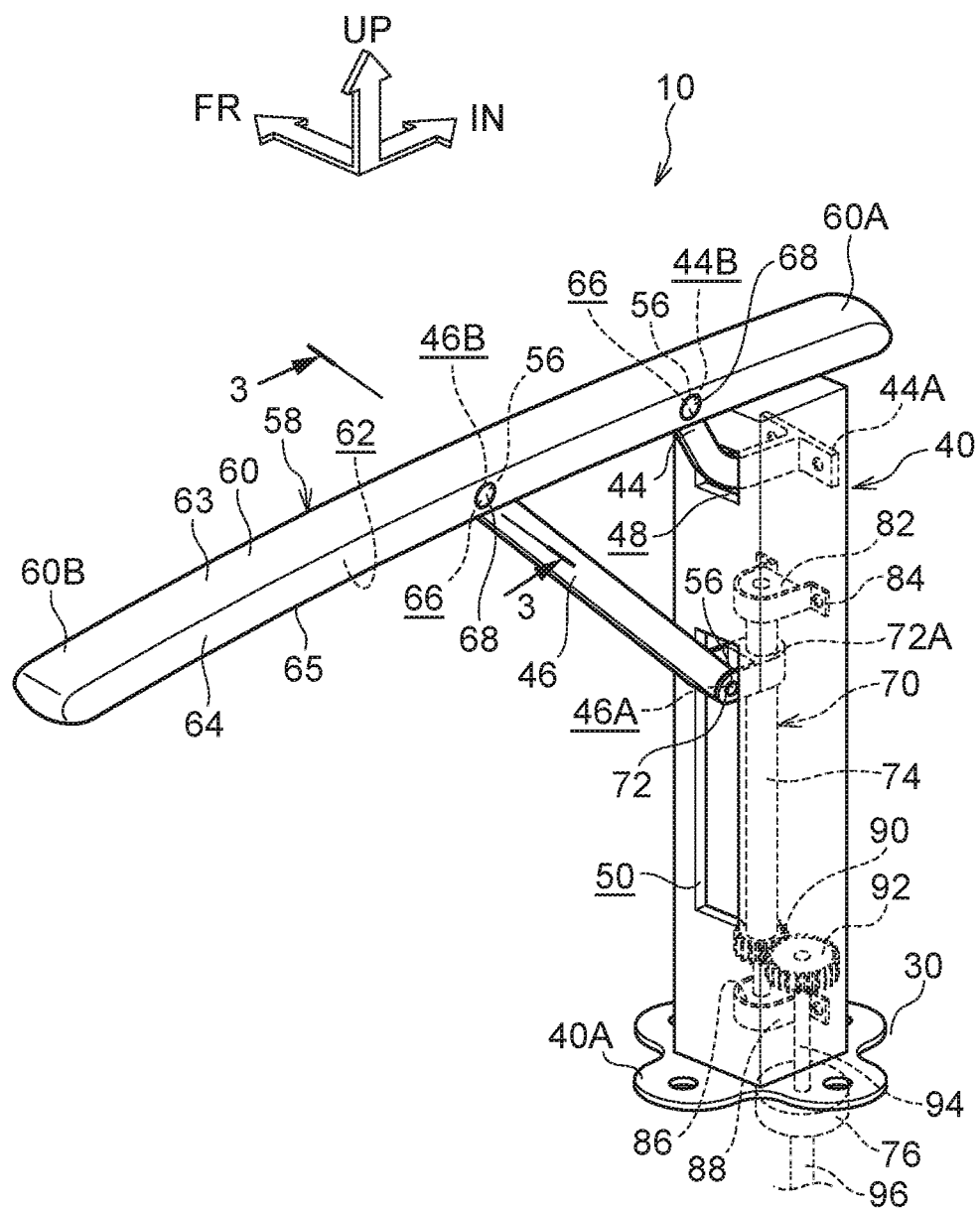
FIG. 2 is a perspective view illustrating an in-use state of a vehicle entry-exit assist device according to the first exemplary embodiment when a door is open.

FIG. 2 illustrates the vehicle entry-exit assist device 10 in a case in which the door is open. The vehicle entry-exit assist device 10 is configured including a support column 40, a handrail 58, and a pivot mechanism 70 for pivoting the handrail 58 toward the vehicle outer side and the vehicle upper side about an axis along the vehicle front-rear direction. Note that a state in which the handrail 58 has been pivoted toward the vehicle outer side and the vehicle upper side when the door is open is referred to as an in-use state, and a state in which the handrail 58 has been stowed at the vehicle inner side when the door is closed is referred to as a stowed state.

The support column 40 is provided along the vehicle vertical direction at the vehicle inner side of a vehicle front side end portion of the rear door opening 22. The support column 40 is formed from a substantially tube shaped metal member. A lower end portion of the support column 40 is fixed to a vehicle body floor 30 through a bracket 40A by, for example, fastening with bolts (not illustrated in the drawings).

Two openings 48, 50, namely an upper opening 48 and a lower opening 50, are formed along the vehicle vertical direction in a vehicle width direction outer side face of the support column 40. The upper opening 48 allows attachment of an upper support member 44, described later, inside the support column 40, and is formed toward the vehicle upper side of the vehicle width direction outer side face of the support column 40. The lower opening 50 allows attachment of a lower support member 46, described later, to the pivot mechanism 70, and is formed at the vehicle lower side of the upper opening 48. The height (vehicle vertical direction length) of the support column 40 is set such that the height from the ground on which an occupant about to enter the vehicle 12 is standing to an upper end of the handrail 58 while in the in-use state is similar to the height of staircase handrails provided in public buildings or the like.

The handrail 58 is configured including a handrail body 60, and the upper support member 44 and the lower support member 46 that support the handrail body 60. The handrail body 60 is, for example, configured by a resin bar member, and is attached to the support column 40 through the upper support member 44 and the lower support member 46 so as to extend with its length direction along the vehicle width direction and a vehicle horizontal direction while in the in-use state. The handrail body 60 is formed including an upper face 63 that is on the vehicle upper side, side portions 64 that are on the vehicle front side and vehicle rear side, and a lower face 65 that is on the vehicle lower side while in the in-use state. A groove 62 that forms a recess opening toward the vehicle lower side while in the in-use state is formed to the lower face 65 so as to run along the length direction of the handrail body 60. The handrail body 60 is coupled to the upper support member 44 at a location corresponding to the vehicle width direction inner side of the groove 62 while in the in-use state. The handrail body 60 is coupled to the lower support member 46 at a location corresponding to a substantially vehicle width direction intermediate portion of the groove 62 while in the in-use state.

Figure 3:
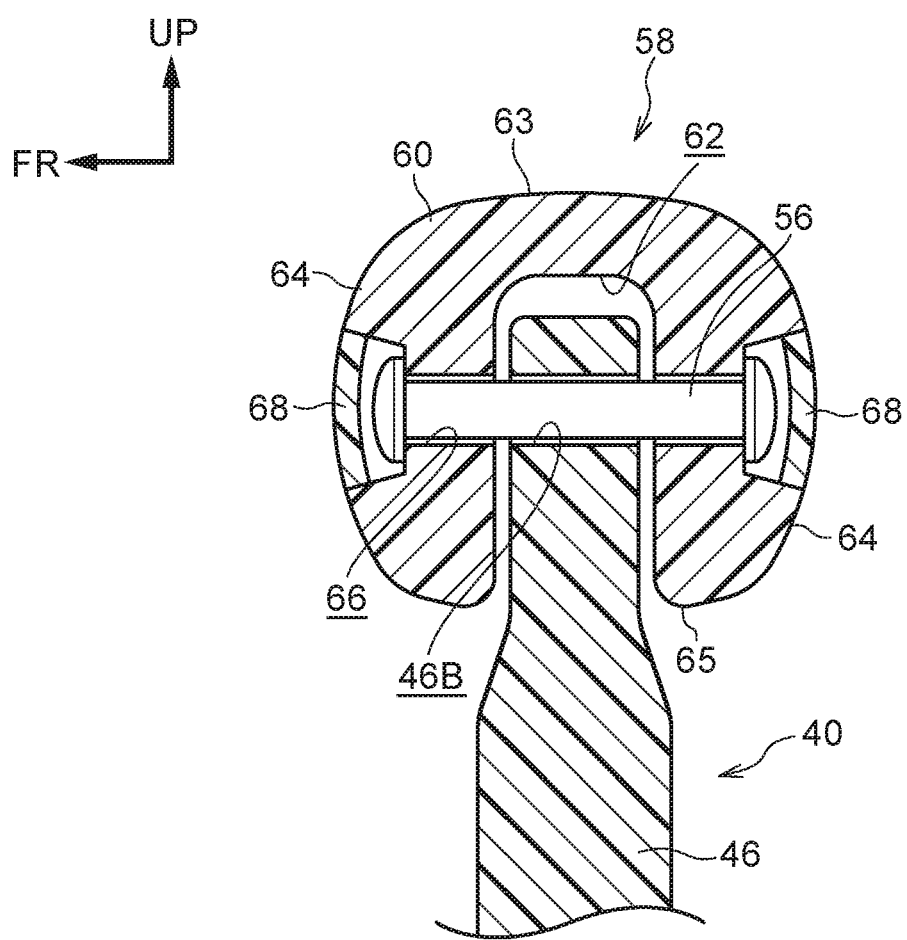
FIG. 3 is a vertical cross-section illustrating a handrail and a lower support member according to the first exemplary embodiment in a state sectioned along line 3-3 in FIG. 2.

As illustrated in FIG. 3, attachment holes 66 are formed penetrating the side portions 64 at locations where the handrail body 60 is coupled to the lower support member 46.

The attachment holes 66 run along the vehicle front-rear direction, this corresponding to the width direction of the handrail body 60. Similarly, attachment holes 66 are formed penetrating the side portions 64 at locations where the handrail body 60 is coupled to the upper support member 44. These attachment holes 66 also run along the vehicle front-rear direction, this corresponding to the width direction of the handrail body 60.

Figure 6:
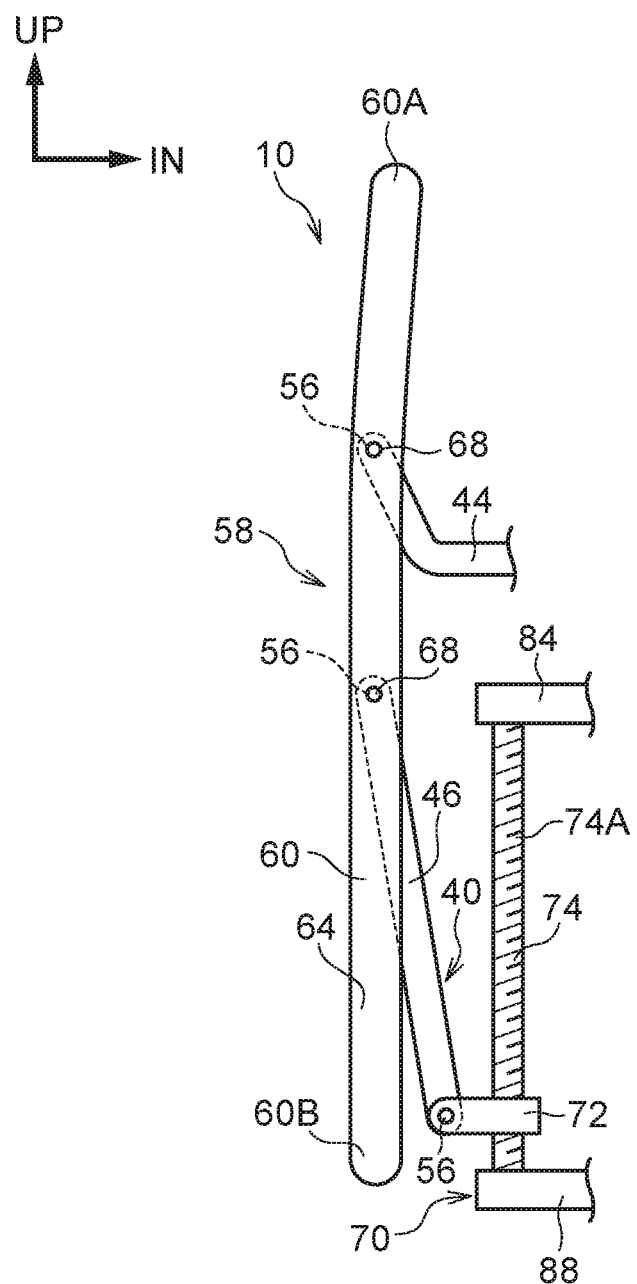
FIG. 6 is a back view illustrating a stowed state of a handrail of a vehicle entry-exit assist device according to the first exemplary embodiment when a door is closed, as viewed from a vehicle rear side.

As illustrated in FIG. 2, an end portion 60A at the vehicle width direction inner side of the handrail body 60 while in the in-use state is formed so as to be positioned further toward the vehicle inner side than the support column 40. Moreover, as illustrated in FIG. 6, an end portion 60B at the vehicle width direction outer side of the handrail body 60 while in the in-use state is formed so as to be positioned further toward the vehicle upper side when in the stowed state than the vehicle body floor 30 to which the bracket 40A of the support column 40 is fixed.

As illustrated in FIG. 2, the upper support member 44 is, for example, formed from a metal bar member, and couples the handrail body 60 and the support column 40 together. A portion of the upper support member 44 spanning from the upper opening 48 to an end portion on the support column 40-side is formed in a linear shape running along the vehicle horizontal direction, and a portion of the upper support member 44 spanning from the upper opening 48 to an end portion on the handrail body 60-side is formed curving toward the vehicle upper side. The support column 40-side end portion of the upper support member 44 is inserted into the support column 40 through the upper opening 48, and flanges 44A formed to this end portion are, for example, fastened with bolts (not illustrated in the drawings) to the inside of the support column 40 so as to fix the upper support member 44 at the support column 40.

As illustrated in FIG. 2, the handrail body 60-side end portion of the upper support member 44 is formed with a thinner thickness than a width BD of the groove 62 formed inside the handrail body 60, and is attached at the inside of the groove 62. An insertion hole 44B that runs along the thickness direction of the upper support member 44 (the vehicle front-rear direction) is formed penetrating the portion of the upper support member 44 attached at the inside of the groove 62. The handrail body 60-side end portion of the upper support member 44 is attached to the groove 62 using a pin 56 inserted through the attachment holes 66 and the insertion hole 44a The handrail body 60 is thereby configured so as to be capable of pivoting about an axis along the vehicle front-rear direction, this corresponding to the length direction of the pin 56 inserted through the insertion hole 44B.

As illustrated in FIG. 2, the lower support member 46 is, for example, formed from a linear shaped metal bar member, and couples the handrail body 60 and the pivot mechanism 70 together. An end portion on the support column 40-side of the lower support member 46 is inserted into the support column 40 through the lower opening 50, and is attached to the pivot mechanism 70. A support column-side insertion hole 46A is formed penetrating the support column 40-side end portion of the lower support member 46 so as to run along the thickness direction of the lower support member 46 (the vehicle front-rear direction). An end portion on the pivot mechanism 70-side of the lower support member 46 is attached to a rotation shaft beating 72 configuring the pivot mechanism 70 using a pin 56 inserted through the support column-side insertion hole 46A. The lower support member 46 is thereby capable of pivoting about an axis along the vehicle front-rear direction, this corresponding to the length direction of the pin 56.

An end portion on the handrail body 60-side of the lower support member 46 is formed with a thinner thickness than the width BD (see FIG. 3) of the groove 62 formed inside the handrail body 60, and is attached at the inside of the groove 62. A handrail-side insertion hole 46B that runs along the thickness direction of the lower support member 46 (the vehicle front-rear direction) is formed penetrating a portion of the lower support member 46 attached to the groove 62. The handrail body 60-side end portion of the lower support member 46 is attached to the groove 62 using a pin 56 (see FIG. 3) inserted through the attachment holes 66 and the handrail-side insertion hole 46B. The handrail body 60 is thereby configured so as to be capable of pivoting about an axis along the vehicle front-rear direction, this corresponding to the length direction of the pin 56 inserted through the handrail-side insertion hole 46B.

Cover members 68 are fitted into the side portions 64 on either side of the handrail body 60 at portions formed with the attachment holes 66 so as to block off the attachment holes 66 into which the pins 56 have been inserted. The cover members 68 are for example configured from the same type of resin material as the handrail body 60, and are each formed in a substantially circular disc shape having substantially the same profile as the openings of the attachment holes 66 in the side portions 64. Thus, the hands or fingers of an occupant gripping the handrail body 60 do not directly touch the pins 56.

Figure 4:
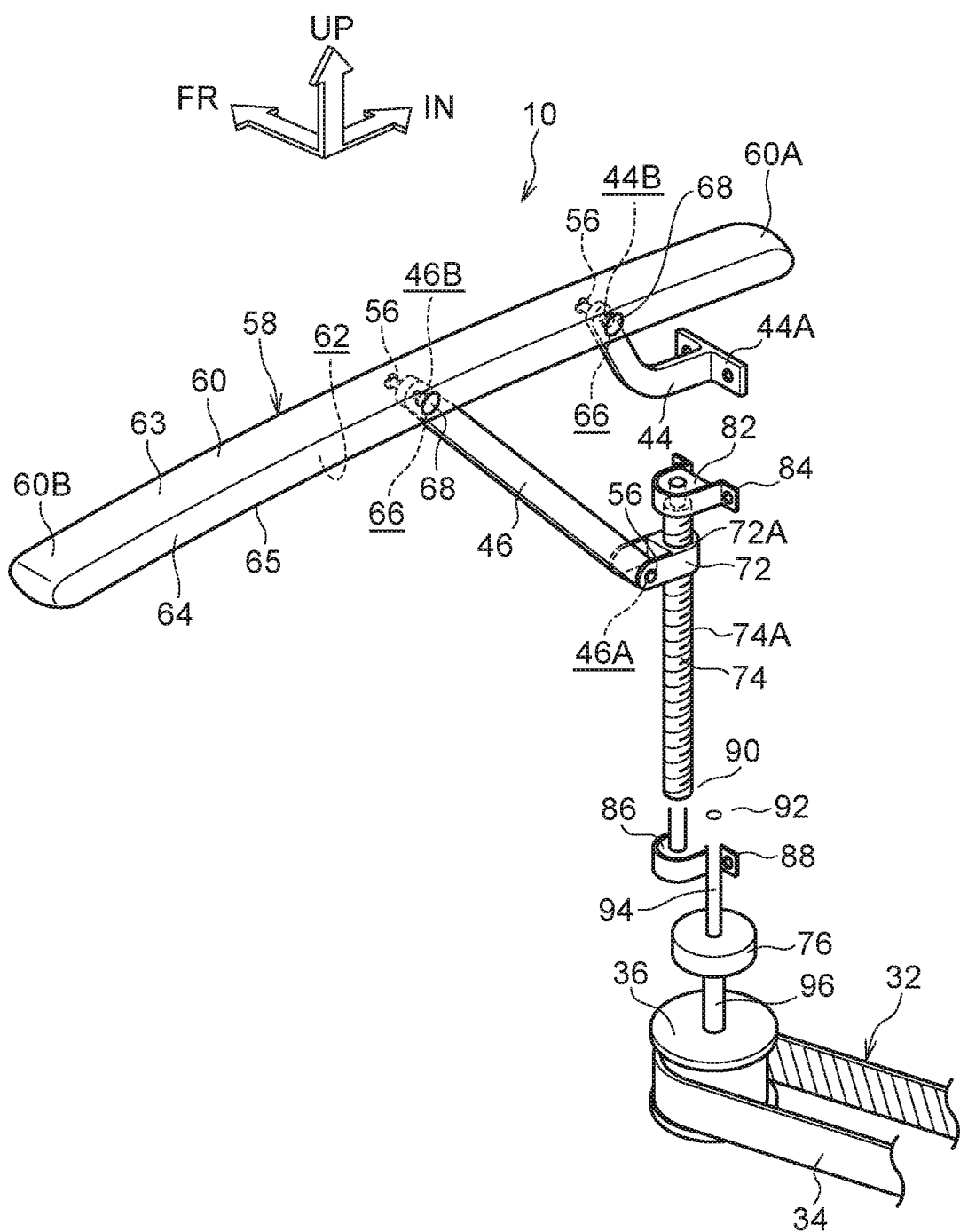
FIG. 4 is a perspective view illustrating a pivot mechanism of a vehicle entry-exit assist device according to the first exemplary embodiment.

As illustrated in FIG. 4, the pivot mechanism 70 is disposed within the support column 40. The pivot mechanism 70 is configured including a rod 74, the rotation shaft bearing 72 that is attached to the rod 74 so as to be capable of vertical movement, a clutch 76 for transmitting motive force from the electric power unit 32 to the rod 74, a rod-side gear 90, and a clutch-side gear 92.

The rod 74 is formed from a circular steel bar member, and a male thread is cut into an outer portion 74A of the rod 74. The rod 74 is disposed inside the support column 40 with its length direction along the vehicle vertical direction. An inner side of the rotation shaft bearing 72 is provided with a female thread portion 72A formed with a female thread, and is attached to the rod 74. The rod 74 is screwed into the female thread portion 72A such that the rotation shaft bearing 72 is attached to the rod 74 so as to be capable of vertical movement relative thereto.

An upper end portion of the rod 74 is rotatably inserted into a substantially circular cylindrical hole (not illustrated in the drawings) formed in a lower end side of an upper shaft bearing 82 that is formed in a substantially circular disc shape. An upper fixing mount 84 that is formed in a strap shape is attached to a side portion of the upper shaft bearing 82. Flanges formed to end portions of the upper fixing mount 84 are fixed to an inner wall on the vehicle width direction inner side of the support column 40, such that the upper shaft bearing 82 is fixed to the support column 40. A lower end portion of the rod 74 is rotatably inserted into a substantially circular cylindrical hole (not illustrated in the drawings) formed in an upper end side of a lower shaft bearing 86 that is formed in a substantially circular disc shape. A lower fixing mount 88 that is formed in a strap shape is attached to a side portion of the lower shaft bearing 86. Flanges formed to end portions of the lower fixing mount 88 are fixed to the inner wall on the vehicle width direction inner side of the support column 40, such that the lower shaft bearing 86 is fixed to the support column 40.

The rod-side gear 90 is formed with outer teeth and is fixed to the lower end portion of the rod 74. The clutch-side gear 92 that meshes with the rod-side gear 90 is also formed with outer teeth and is disposed at the vehicle rear side of the rod-side gear 90. Both the rod-side gear 90 and the clutch-side gear 92 are formed with a smaller diameter than the diameter of the rollers 36.

An upper transmission shaft 94 formed in a circular rod shape is inserted into the clutch-side gear 92 from a lower end side. The upper transmission shaft 94 passes through the vehicle body floor 30 and is connected to the clutch 76 disposed at the vehicle lower side of the vehicle body floor 30 (see FIG. 2). A lower transmission shaft 96 formed in a circular rod shape is inserted into a lower end of the clutch 76 from a lower end side of the clutch 76. The lower transmission shaft 96 is coupled to the rollers 36 around which the motor belt 34 of the electric power unit 32 is entrained.

Operation and Advantageous Effects

Explanation follows regarding operation and advantageous effects of the present exemplary embodiment.

As illustrated in FIG. 4, when opening the sliding door 24, the electric power unit 32 is actuated such that the motor of the electric power unit 32 drives the motor belt 34, moving the sliding door 24 toward the vehicle rear side. At the same time as the motor belt 34 is being driven to open the sliding door 24, the rollers 36 around which the motor belt 34 is entrained rotate. When the rollers 36 rotate, the clutch-side gear 92 rotates through the clutch 76 that couples the upper transmission shaft 94 and the lower transmission shaft 96. Motive force generated by rotation of the clutch-side gear 92 is transmitted to the rod 74 through the rod-side gear 90, thereby rotating the rod 74.

Figure 5:
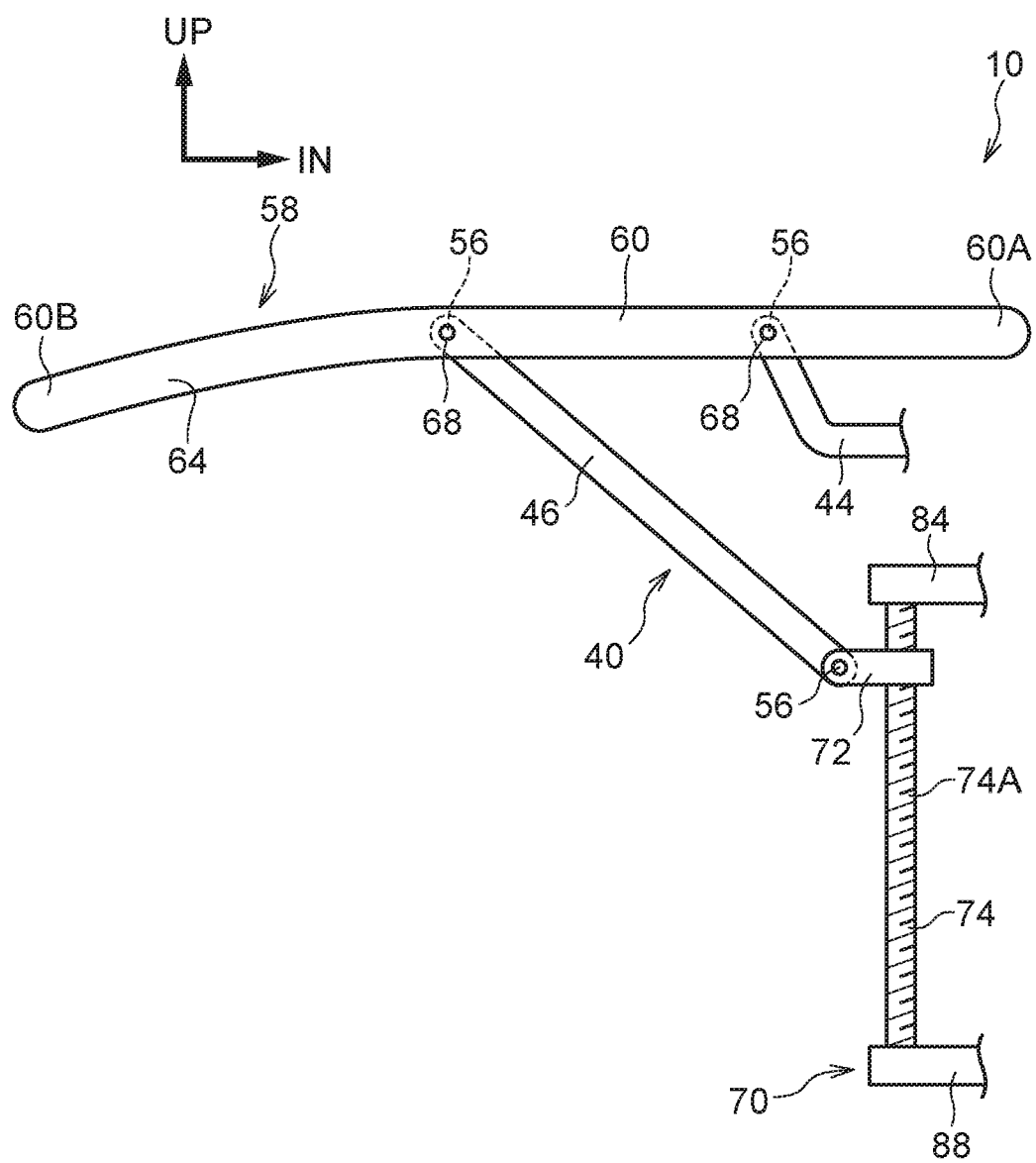
FIG. 5 is a back view illustrating an in-use state of a handrail of a vehicle entry-exit assist device according to the first exemplary embodiment when a door is open, as viewed from a vehicle rear side.

As illustrated in FIG. 5, the rotation shaft bearing 72 that was positioned at the lower end side of the rod 74 ascends the rod 74 due to the rotation of the rod 74. Thus, the lower support member 46 moves toward the vehicle upper side, and the handrail body 60 coupled to the lower support member 46 is pivoted toward the vehicle outer side and the vehicle upper side about an axis along the vehicle front-rear direction. The length of the rod 74 is set so as to be shorter than a distance by which the sliding door 24 moves toward the vehicle rear side. Moreover, since the rod-side gear 90 and the clutch-side gear 92 are each formed with a smaller diameter than the diameter of the rollers 36, the rod-side gear 90 and the clutch-side gear 92 that are rotated by rotation of the rollers 36 rotate faster than the rollers 36. Thus, the rotation shaft bearing 72 finishes its ascent from a lower end portion to an upper end portion of the rod 74 by the time opening of the sliding door 24 is complete. Thus, the handrail body 60 is pivoted from the stowed state to the in-use state at the same time as the sliding door 24 is opened, and the pivoting to the in-use state is finished prior to the movement of the sliding door 24 toward the vehicle rear side being complete.

As illustrated in FIG. 4, when closing the sliding door 24, the electric power unit 32 is actuated such that the motor of the electric power unit 32 drives the motor belt 34, thereby moving the sliding door 24 that has been moved to the vehicle rear side toward the vehicle front side. At the same time as the motor belt 34 is being driven to close the sliding door 24, the rollers 36 around which the motor belt 34 is entrained rotate. When the rollers 36 rotate, the clutch-side gear 92 rotates through the clutch 76 that couples the upper transmission shaft 94 and the lower transmission shaft 96. Motive force generated by rotation of the clutch-side gear 92 is transmitted to the rod 74 through the rod-side gear 90, thereby rotating the rod 74.

As illustrated in FIG. 6, the rotation shaft bearing 72 that was positioned at the upper end side of the rod 74 descends along the rod 74 due to rotation of the rod 74. Thus, the lower support member 46 moves toward the vehicle lower side, and the handrail body 60 coupled to the lower support member 46 is pivoted toward the vehicle inner side and vehicle lower side about an axis along the vehicle front-rear direction. Since the rod-side gear 90 and the clutch-side gear 92 that are rotated by rotation of the rollers 36 rotate faster than the rollers 36, the rotation shaft bearing 72 finishes its descent from the upper end portion to the lower end portion of the rod 74 by the time closing of the sliding door 24 is complete. Thus, the handrail body 60 is pivoted from the in-use state to the stowed state at the same time as or before the sliding door 24 is closed, and the pivoting to the stowed state is finished prior to the movement of the sliding door 24 toward the vehicle front side being complete.

In the vehicle entry-exit assist device 10 according to the present exemplary embodiment, the vehicle width direction outer side end portion 60B of the handrail body 60 is pivoted toward the vehicle outer side and the vehicle upper side about an axis of the handrail body 60 running along the vehicle front-rear direction so as to be positioned at the vehicle outer side while in the in-use state. The vehicle width direction inner side end portion 60A is configured so as to be positioned at the vehicle inner side of the support column 40 while in the in-use state. This enables an occupant to easily hold onto the handrail that is toward the front of the body of the occupant in the direction of progress of the occupant, both when entering and exiting the vehicle. The occupant is therefore able to steady their posture and reduce the burden on their legs, facilitating entry and exit of the vehicle.

Moreover, in the vehicle entry-exit assist device 10 according to the present exemplary embodiment, the handrail 58 is stowed along the support column 40 running along the vehicle vertical direction at the vehicle inner side of a front end portion of the rear door opening 22 prior to closing of the sliding door 24 being complete. This enables space for the occupant to be secured inside the vehicle.

As explained above, the vehicle entry-exit assist device 10 according to the present exemplary embodiment is capable of facilitating entry and exit for the occupant in a case in which the door is open, and enables vehicle interior space to be secured for the occupant in a case in which the door is closed.

Furthermore, in the vehicle entry-exit assist device 10 according to the present exemplary embodiment, employing the electric power unit 32 that opens and closes the sliding door 24 enables the handrail body 60 to be pivoted toward the vehicle outer side and the vehicle upper side about an axis along the vehicle front-rear direction. There is accordingly no need to provide a separate device to drive to the vehicle entry-exit assist device 10, thereby enabling an increase in manufacturing costs of the vehicle entry-exit assist device 10 to be suppressed.

Moreover, in the vehicle entry-exit assist device 10 according to the present exemplary embodiment, the handrail body 60 is pivoted to the in-use state prior to opening of the sliding door 24 being complete. This enables an occupant entering or exiting the vehicle 12 to easily hold onto the handrail body 60.

Moreover, in the vehicle entry-exit assist device 10 according to the present exemplary embodiment, the handrail body 60 extends along the vehicle horizontal direction while in the in-use state. Furthermore, the height from the ground on which an occupant about to enter the vehicle 12 is standing to an upper face of the handrail body 60 configuring the upper end of the handrail 58 is set so as to be similar to the height of staircase handrails provided in public buildings or the like. Thus, for example, even if the occupant is an elderly person with a weak grip, the occupant is able to hold onto the handrail body 60 with a weak force, and is therefore able to steady their posture.

First Modified Example

Figure 7:
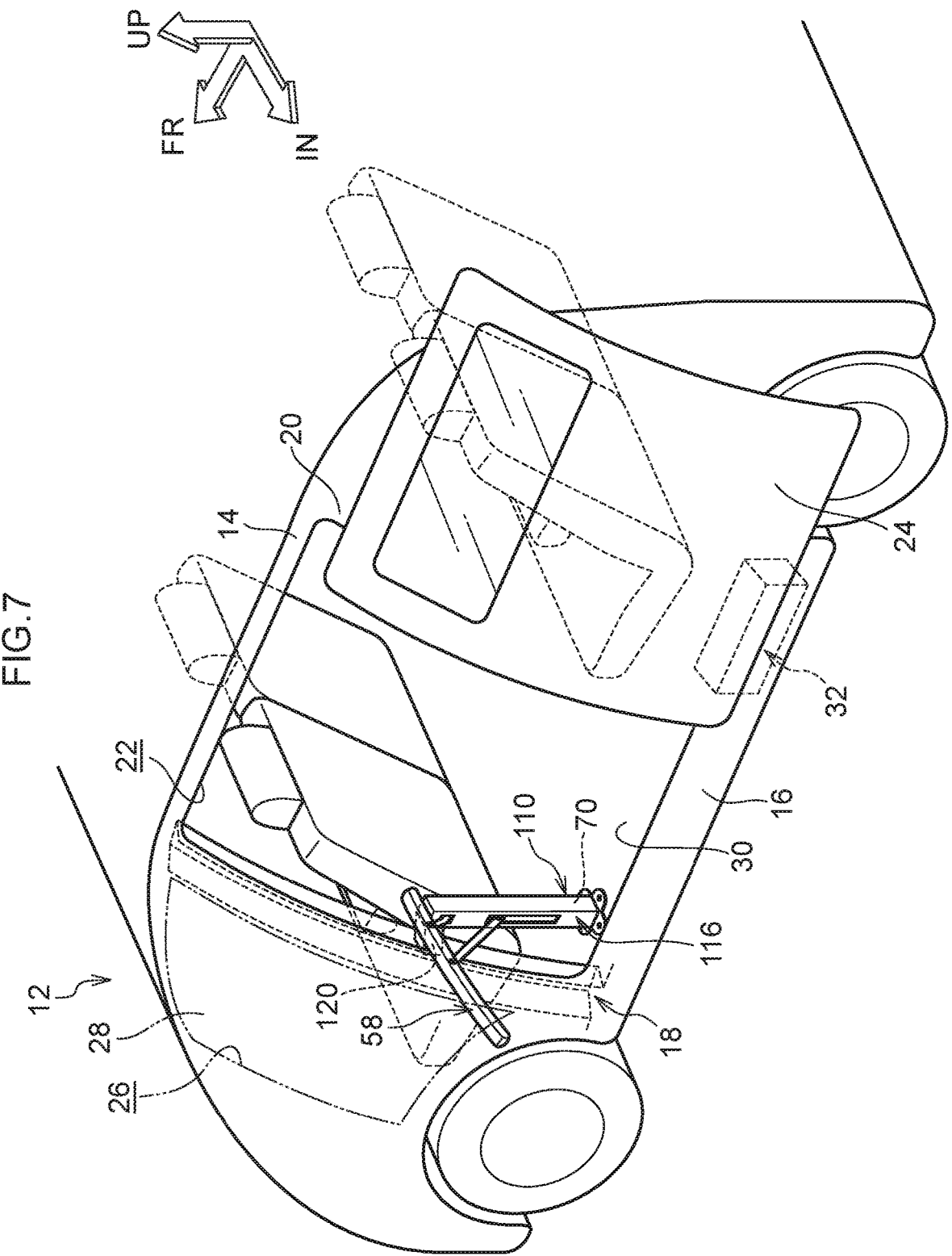
FIG. 7 is a perspective view illustrating a vehicle provided with a vehicle entry-exit assist device according to a first modified example of the first exemplary embodiment, as viewed from a rear-left side.

Next, explanation follows regarding a first modified example of the present exemplary embodiment, with reference to FIG. 7. Note that configuration portions that are the same as those in the exemplary embodiment described above are appended with the same reference numerals, and explanation thereof is omitted.

As illustrated in FIG. 7, in a vehicle entry-exit assist device 110 according to the present modified example, a support column 116 is coupled to the center pillar 18 through a reinforcing member 120 provided at the vehicle front side of the support column 116. The support column 116 is therefore attached even more stably to the vehicle 12. This enables an occupant to hold onto the handrail 58 that is toward the front of the body of the occupant in the direction of progress of the occupant and thereby steady their posture both when entering and exiting the vehicle, facilitating entry and exit of the vehicle.

Second Modified Example

Figure 8:
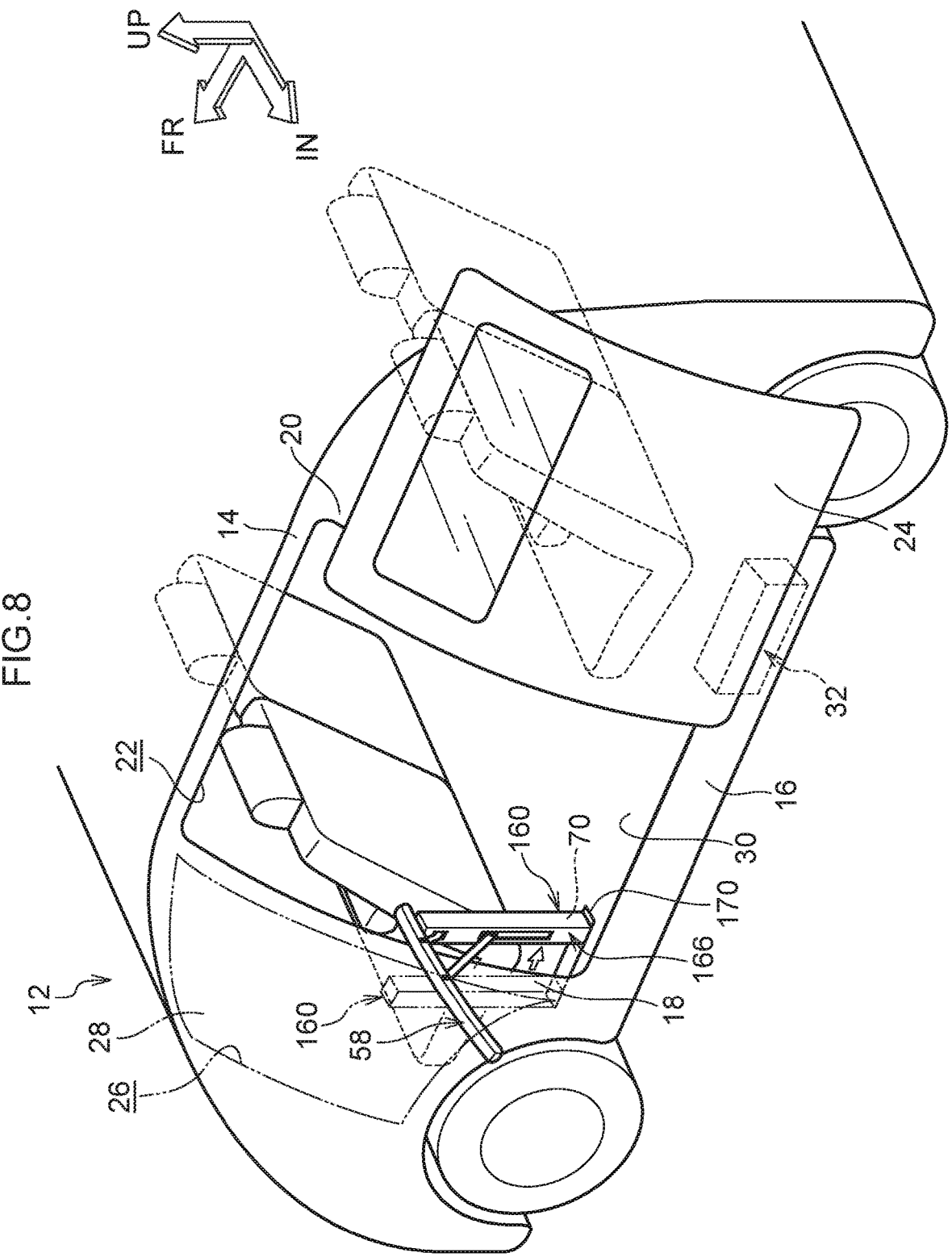
FIG. 8 is a perspective view illustrating a vehicle provided with a vehicle entry-exit assist device according to a second modified example of the first exemplary embodiment, as viewed from a rear-left side.

Next, explanation follows regarding a second modified example of the present exemplary embodiment, with reference to FIG. 8. Note that configuration portions that are the same as those in the exemplary embodiment described above are appended with the same reference numerals, and explanation thereof is omitted.

As illustrated in FIG. 8, in a vehicle entry-exit assist device 160 according to the present modified example, a support column 166 is attached to a slide groove 170 so as to be capable of sliding along the vehicle front-rear direction through a non-illustrating slide mechanism. The slide groove 170 is formed along the vehicle front-rear direction at the vehicle lower side of the support column 166. The slide mechanism is provided so as to operate in conjunction with an electric power unit, Thus, the vehicle entry-exit assist device 160 slides along the slide groove 170 toward the vehicle rear side as the sliding door 24 opens. The vehicle entry-exit assist device 160 also slides along the slide groove 170 toward a location between the center pillar 18 and a seat of the vehicle 12 at the vehicle front side (see the double-dotted dashed line in FIG. 8) as the sliding door 24 closes. This enables even more vehicle interior space for the occupant to be secured when the sliding door 24 is closed.

Second Exemplary Embodiment

Explanation follows regarding a vehicle entry-exit assist device 210 according to a second exemplary embodiment of the present invention, with reference to FIG. 9 to FIG. 15. Note that configuration portions that are the same as those in the first exemplary embodiment described above are appended with the same reference numerals, and explanation thereof is omitted.

Figure 9:
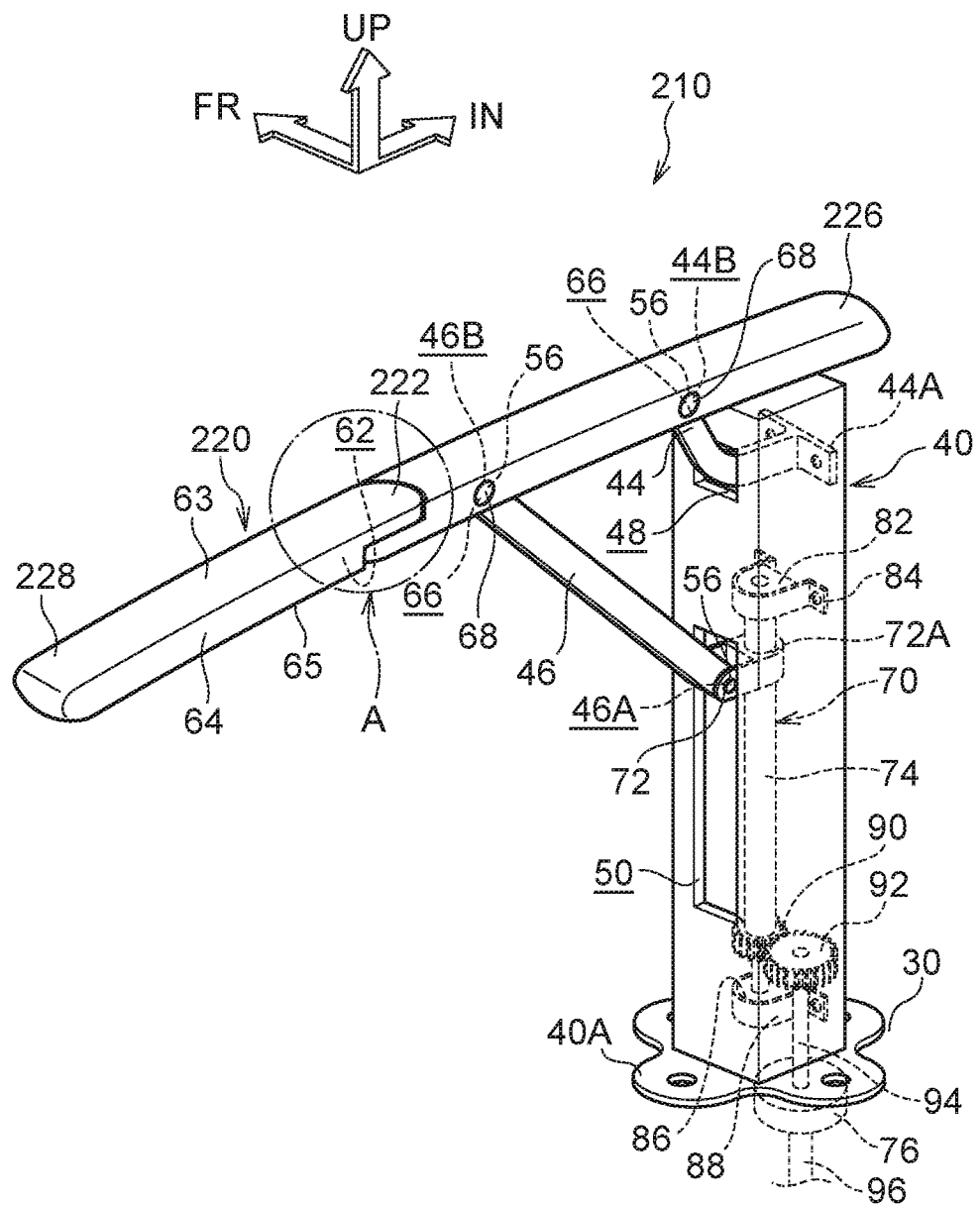
FIG. 9 is a perspective view illustrating an in-use state of a vehicle entry-exit assist device according to a second exemplary embodiment when a door is open.

As illustrated in FIG. 9, in the vehicle entry-exit assist device 210 according to the second exemplary embodiment, a handrail 220 is divided into a vehicle width direction inner side portion and a vehicle width direction outer side portion at a dividing section 222 located at an intermediate portion in the vehicle width direction, this corresponding to the length direction of the handrail 220, in an in-use state in which the handrail 220 has been pivoted toward the vehicle outer side and the vehicle upper side. A first handrail portion 226 is thereby formed spanning from the dividing section 222 to a vehicle width direction inner side end portion of the handrail 220. A second handrail portion 228 is formed spanning from the dividing section 222 to a vehicle width direction outer side end portion of the handrail 220. The handrail 220 is divided along the vehicle width direction and vehicle front-rear direction such that while in the in-use state, the second handrail portion 228 is configured at the vehicle upper side of the dividing section 222, and the first handrail portion 226 is configured at the vehicle lower side of the dividing section 222. The first handrail portion 226 and the second handrail portion 228 at thereby formed so as to overlap each other in the vehicle vertical direction at the dividing section 222 while in the in-use state.

Figure 10:
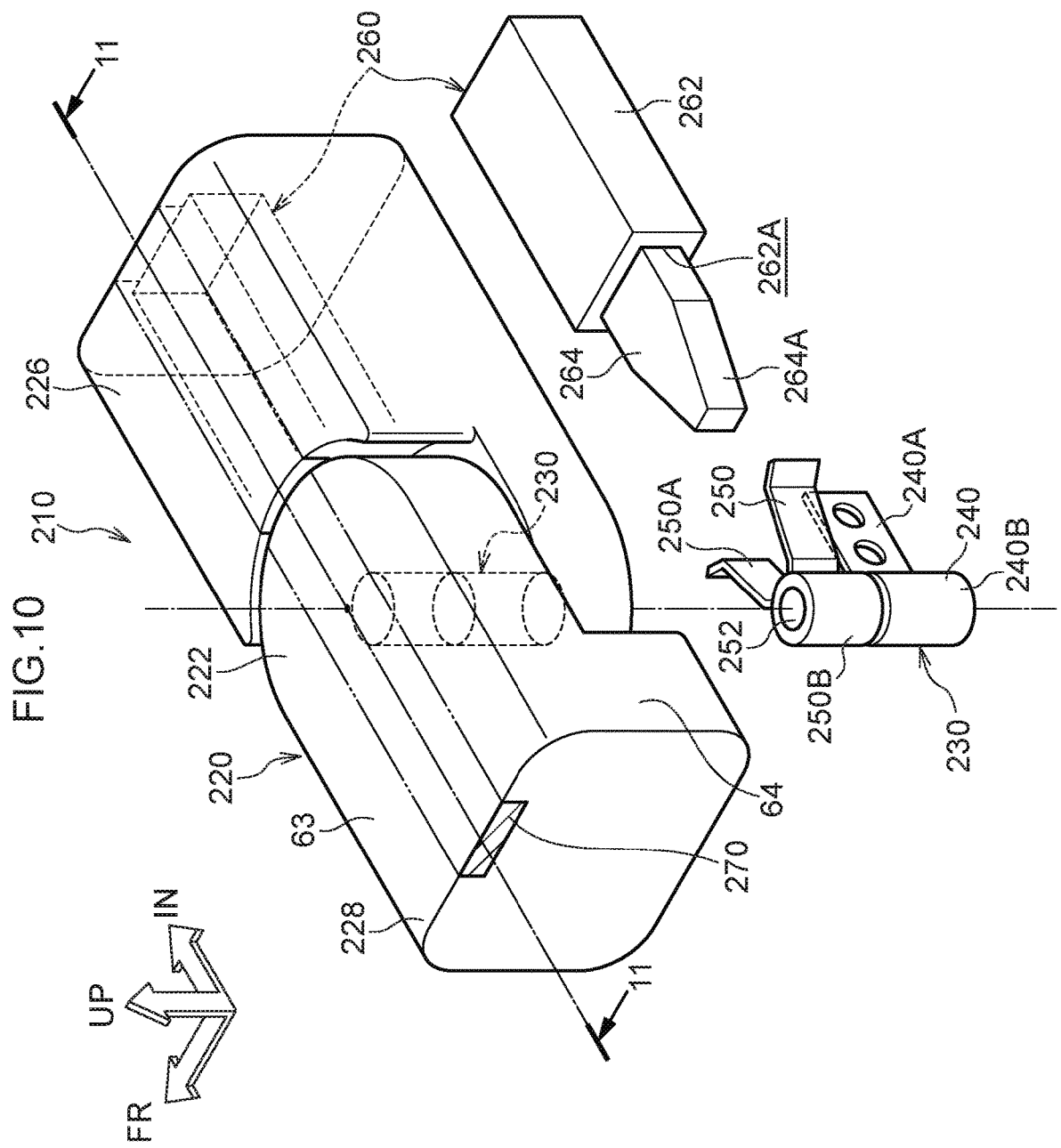
FIG. 10 is an enlarged view illustrating a dividing section of a handrail in the region indicated by arrow A in FIG. 9.
Figure 11:
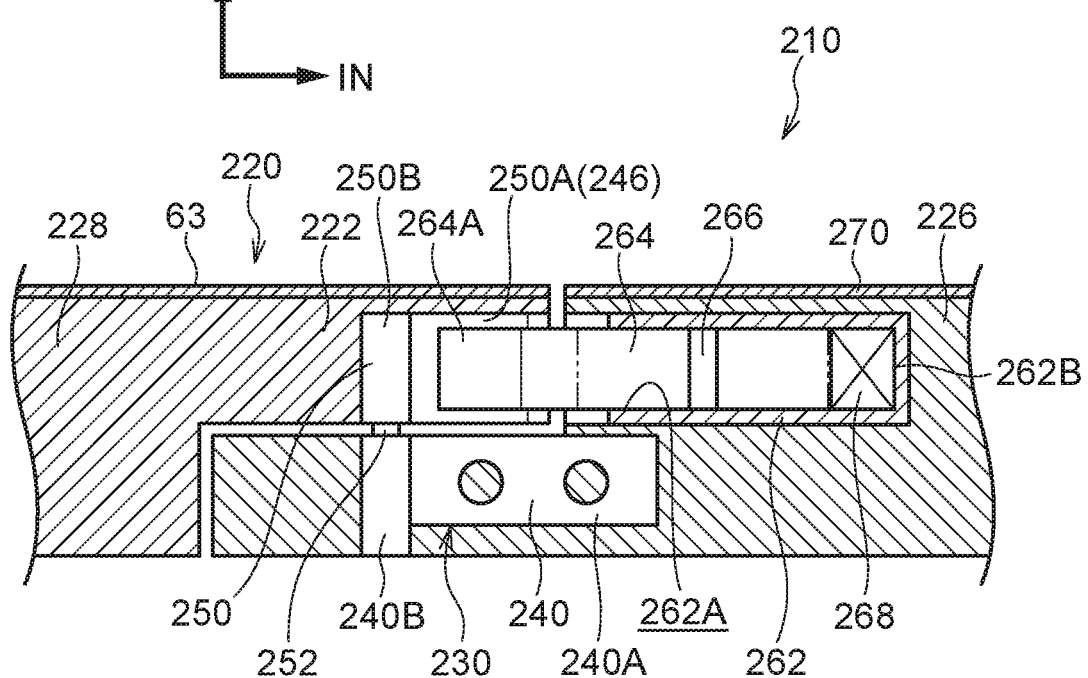
FIG. 11 is a vertical cross-section illustrating the handrail illustrated in FIG. 10 in a state sectioned along line 11-11 in FIG. 10.

As illustrated in FIG. 10 and FIG. 11, the first handrail portion 226 and the second handrail portion 228 are hinge-joined by a dividing hinge 230 (see the lower-left side of FIG. 10) provided to the dividing section 222. The second handrail portion 228 is thereby coupled to the first handrail portion 226 so as to be capable of pivoting toward the vehicle front side and vehicle rear side (see the double-dotted dashed lines in FIG. 13) about an axis along the vehicle vertical direction, this corresponding to the axial direction of the dividing hinge 230, while in the in-use state.

The dividing hinge 230 is configured including a metal fixed-side hinge 240 installed on the first handrail portion 226 side of the dividing section 222, a metal pivoting-side hinge 250 installed on the second handrail portion 228 side of the dividing section 222, and a metal hinge pin 252 that couples the fixed-side hinge 240 and the pivoting-side hinge 250 together.

A plate shaped first plate portion 240A of the fixed-side hinge 240 is embedded within the first handrail portion 226 on the dividing section 222 side. The first plate portion 240A extends along the vehicle width direction at a vehicle front-rear direction substantially intermediate portion of the first handrail portion 226 while in the in-use state. A substantially circular cylinder shaped first cylinder portion 240B is formed at a vehicle width direction outer side end portion of the first plate portion 240A of the fixed-side hinge 240 while in the in-use state. A hole through which the hinge pin 252 is inserted is provided inside the first cylinder portion 240B.

A recessed groove 246 is formed at a vehicle front-rear direction intermediate portion and vehicle width direction inner side end portion on the dividing section 222 side of the second handrail portion 228 while in the in-use state. The recessed groove 246 forms a recess opening toward the vehicle width direction inner side (the first handrail portion 226 side), and runs along the vehicle width direction when the handrail 220 is in the in-use state. The recessed groove 246 is formed such that its groove width (a spacing between inner faces opposing each other in the vehicle front-rear direction) narrows on progression toward the vehicle width direction outer side while in the in-use state. Second plate portions 250A, configuring the pivoting-side hinge 250 and formed so as to conform to an inner profile of the recessed groove 246, are attached to the inner faces of the recessed groove 246. A substantially circular cylinder shaped second cylinder portion 250B is formed at vehicle width direction outer side end portions of the second plate portions 250A of the pivoting-side hinge 250 while in the in-use state. A hole through which the hinge pin 252 is inserted is provided inside the second cylinder portion 250B.

The hole through the first cylinder portion 240B and the hole through the second cylinder portion 250B are disposed so as to overlap each other in the vehicle vertical direction while in the in-use state. The hinge pin 252 is inserted through the holes through the first cylinder portion 240B and the second cylinder portion 250B so as to run along the axial direction of the first cylinder portion 240B and the second cylinder portion 250B. The second handrail portion 228, including the pivoting-side hinge 250, is thereby capable of pivoting toward the vehicle front side and vehicle rear side about an axis corresponding to the axial direction of the hinge pin 252.

A restricting mechanism 260 is configured in a vehicle width direction outer side end portion and vehicle front-rear direction intermediate portion of the first handrail portion 226 that is at the vehicle upper side while in the in-use state. The restricting mechanism 260 is disposed so as to oppose the pivoting-side hinge 250 assembled to the second handrail portion 228 along the vehicle width direction while in the in-use state. The restricting mechanism 260 is configured including a solenoid portion 262, and a metal protruding pin 264 that is capable of being projected toward the second handrail portion 228 side by the solenoid portion 262. A pointed end 264A with an outer profile that is substantially the same as an inner profile of the pivoting-side hinge 250 is formed to a vehicle width direction outer side end portion of the protruding pin 264 while in the in-use state. The pointed end 264A is molded such that its width (vehicle front-rear direction length while in the in-use state) narrows on progression toward the vehicle width direction outer side while in the in-use state, such that the pointed end 264A can be inserted snugly into the inner profile of the pivoting-side hinge 250 without leaving a gap.

The solenoid portion 262 of the restricting mechanism 260 is formed in a substantially rectangular, hollow box shape and is embedded in the first handrail portion 226. An opening 262A is formed in a vehicle width direction outer side end portion of the solenoid portion 262, this portion corresponding to an end portion on the side opposing the pivoting-side hinge 250 while in the in-use state. The protruding pin 264 is attached to the solenoid portion 262 from the opening 262A side. The protruding pin 264 is attached to a plate shaped plunger 266 disposed on the vehicle width direction inner side of the solenoid portion 262 while in the in-use state.

Figure 12:
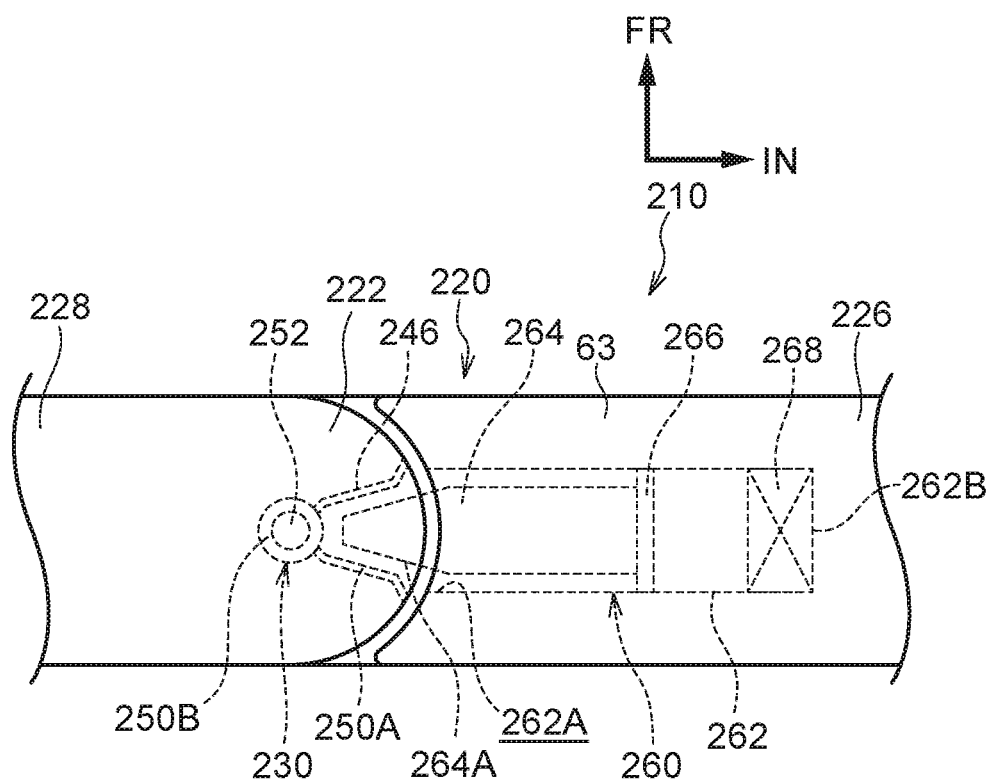
FIG. 12 is an explanatory diagram illustrating a state in which pivoting of a second handrail portion is restricted by a restricting mechanism according to the second exemplary embodiment.
Figure 13:
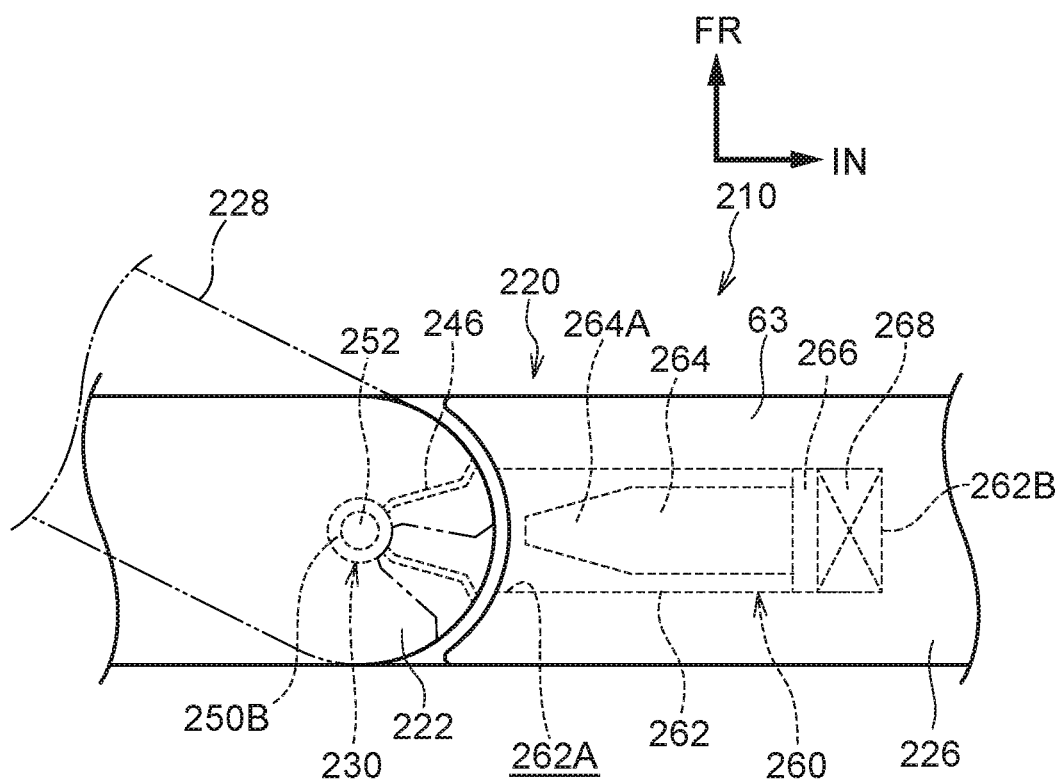
FIG. 13 is an explanatory diagram illustrating a state in which pivoting of a second handrail portion is not restricted by a restricting mechanism according to the second exemplary embodiment.

The plunger 266 is biased toward the vehicle width direction inner side or outer side while in the in-use state by a solenoid 268 configured including an iron core, a coil, a compression coil spring, and the like, not illustrated in the drawings. Thus, as illustrated in FIG. 12 and FIG. 13, the protruding pin 264 attached to the plunger 266 slides along the interior of the solenoid portion 262. Thus, when pivoting of the second handrail portion 228 is to be restricted, the protruding pin 264 that was stowed in the solenoid portion 262 is made to project from the opening 262A toward the pivoting-side hinge 250. When pivoting of the second handrail portion 228 is not being restricted, the protruding pin 264 is stowed within the solenoid portion 262.

Note that although explanation has been given in which the first handrail portion 226 and the second handrail portion 228 are hinge-joined by the dividing hinge 230, there is no limitation thereto, and handrails may for example be joined together by a ball joint or the like.

Figure 14:
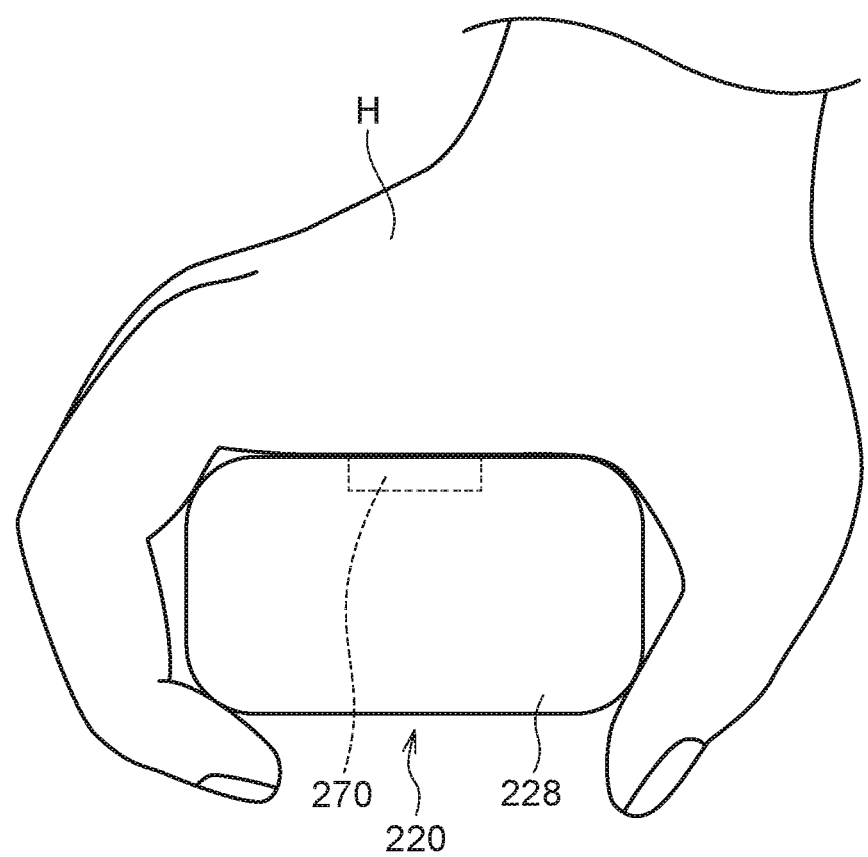
FIG. 14 is a side view illustrating a state in which an occupant is firmly gripping a handrail, as viewed from a vehicle outer side.
Figure 15:
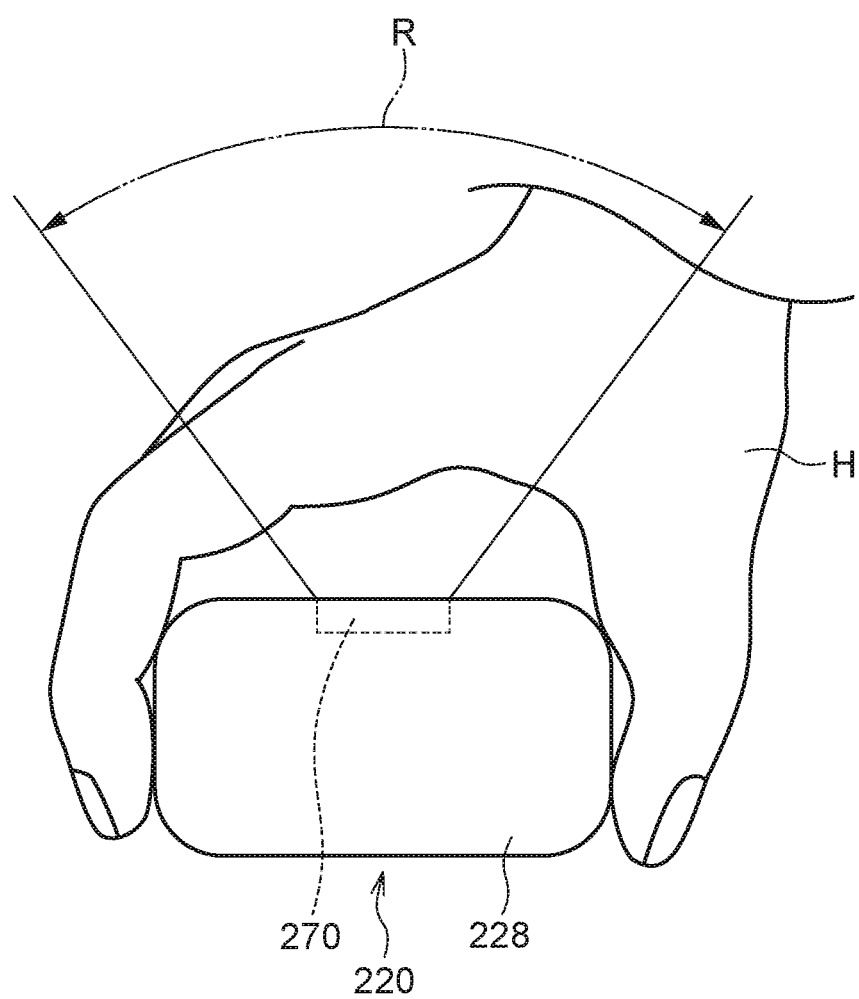
FIG. 15 is a side view illustrating a state in which a space is present between a handrail and the palm of the hand of an occupant when the occupant is gripping the handrail, as viewed from a vehicle outer side.

As illustrated in FIG. 10, a sensor section 270 is disposed running in the length direction of the handrail 220 along the upper face 63 configuring an upper face of the handrail 220 while in the in-use state. The sensor section 270 detects when the hand H of an occupant (see FIG. 14 and FIG. 15) is gripping the handrail 220. Note that an electrostatic sensor is employed as the sensor section 270. Detecting a change in electrostatic capacitance between the sensor section 270 and a detection target (the hand H of the occupant gripping the handrail 220) enables the detection target to be detected over a wide detection range. Specifically, as illustrated in FIG. 14, the hand. H of an occupant is detected to be gripping the handrail 220 when the hand H of the occupant is firmly gripping the handrail 220. As illustrated in FIG. 15, even when the handrail 220 is gripped in a state in which a space is present between the palm of the hand H of the occupant and the upper side of the handrail 220, as long the hand H is within a sensing range R of the electrostatic sensor configuring the sensor section 270, the hand H of the occupant can be detected to be gripping the handrail 220.

Note that although explanation has been given in which an electrostatic sensor is employed as the sensor section 270, there is no limitation thereto, and another sensor or the like that is capable of detecting a hand of an occupant, such as an infrared sensor or a physical switch, may be employed.

Operation and Advantageous Effects

Explanation follows regarding operation and advantageous effects of the present exemplary embodiment.

As illustrated in FIG. 10, in the vehicle entry-exit assist device 210 according to the present exemplary embodiment, the handrail 220 is configured by the first handrail portion 226 and the second handrail portion 228 that is coupled to the first handrail portion 226 so as to be capable of pivoting toward the vehicle front side and vehicle rear side. The sensor section 270 is provided along the length direction of the upper face 63 while in the in-use state, thereby enabling detection of the hand H of an occupant gripping the handrail 220. The restricting mechanism 260 is also provided to the handrail 220. As illustrated in FIG. 12, when the sensor section 270 detects that an occupant is gripping the handrail 220, the restricting mechanism 260 restricts pivoting of the second handrail portion 228 toward the vehicle front side and vehicle rear side in conjunction with the sensor section 270. Thus, as illustrated in FIG. 14 and FIG. 15, an occupant gripping the handrail 220 when entering or exiting the vehicle 12 is able to grip the handrail 220 steadily, thereby enabling the occupant to steady their posture when entering or exiting the vehicle 12.

Furthermore, in the vehicle entry-exit assist device 210 according to the present exemplary embodiment, when gripping by an occupant is not being detected by the sensor section 270, the second handrail portion 228 is capable of pivoting toward the vehicle front side and vehicle rear side while in the in-use state, as illustrated by the double-dotted dashed lines in FIG. 13. Thus, if a pedestrian walking at the exterior of the vehicle or a bicycle passing by the exterior of the vehicle contacts the handrail 220, the second handrail portion 228 pivots freely toward whichever out of the vehicle front side or vehicle rear side corresponds to the direction of progress of the pedestrian or the bicycle. This enables the impact from the second handrail portion 228 received by the pedestrian or the cyclist who has contacted the second handrail portion 228 to be lessened, enabling an improvement in pedestrian and cyclist safety.

The groove width of the pivoting-side hinge 250 assembled to the second handrail portion 228 is formed so as to narrow on progression from the opening facing the first handrail portion 226 toward the inner side, this corresponding to a vehicle width direction outer side end portion of the second handrail 228 while in the in-use state. Moreover, the pointed end 264A that has substantially the same outer profile as the inner profile of the pivoting-side hinge 250 is formed to the vehicle width direction outer side end portion of the protruding pin 264 while in the in-use state. The width of the pointed end 264A is formed so as to narrow on progression toward the vehicle width direction outer side while in the in-use state, enabling the pointed end 264A to be snugly inserted into the inner profile of the pivoting-side hinge 250 without leaving a gap. Thus, as illustrated by the double-dotted dashed lines in FIG. 13, the protruding pin 264 that projects toward the second handrail portion 228 can be inserted into the pivoting-side hinge 250 even in a state in which the second handrail portion 228 has pivoted somewhat toward the vehicle front side or vehicle lower side. Furthermore, since the pointed end 264A of the protruding pin 264 is inserted into the pivoting-side hinge 250 without leaving a gap, the first handrail portion 226 and the second handrail portion 228 can be stably fixed in place.

First Modified Example

Figure 16:
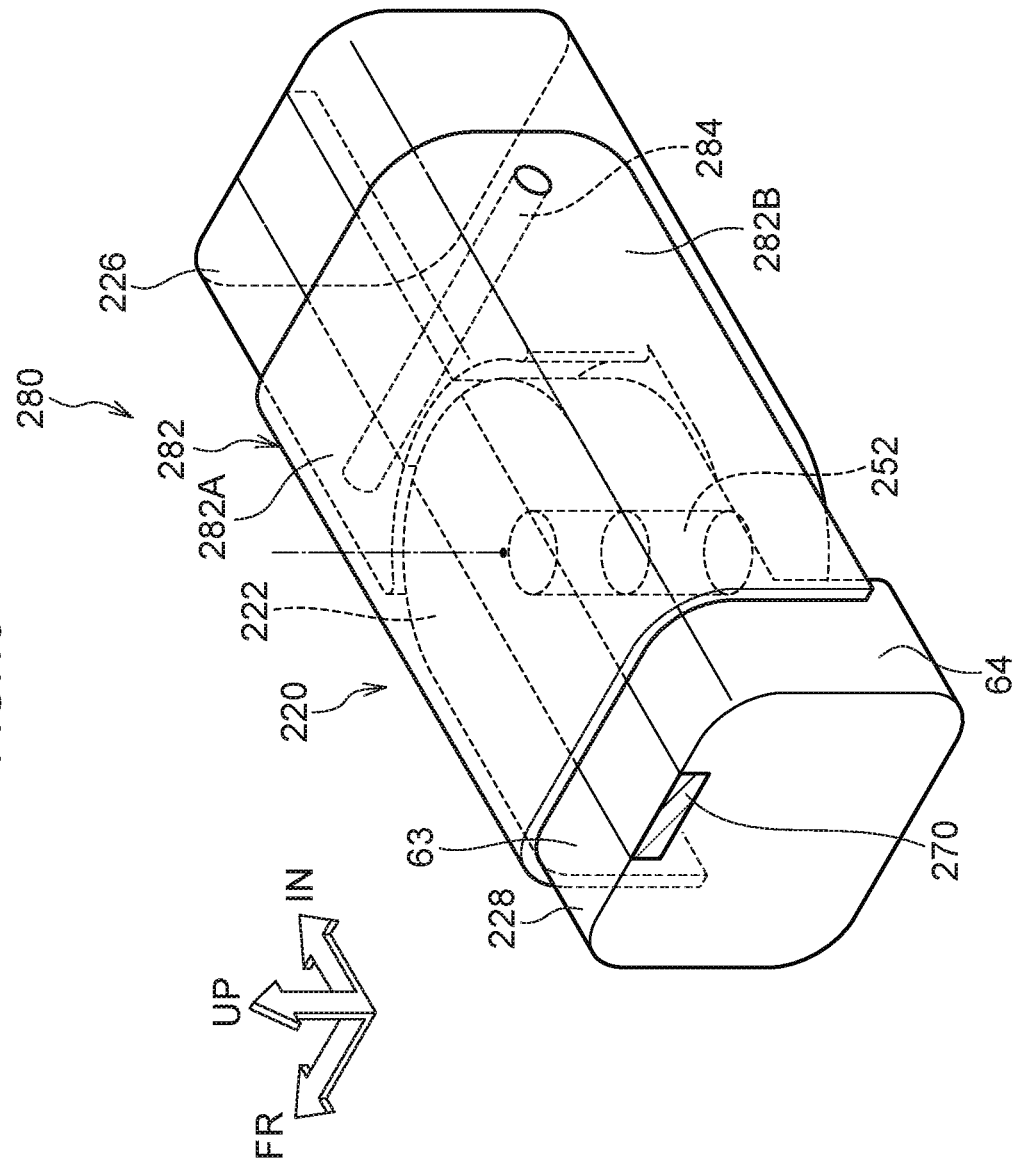
FIG. 16 is a perspective view illustrating a restricting mechanism according to a first modified example of the second exemplary embodiment.

Next, explanation follows regarding a first modified example of the present exemplary embodiment, with reference to FIG. 16. Note that configuration portions that are the same as those in the exemplary embodiment described above are appended with the same reference numerals, and explanation thereof is omitted.

As illustrated in FIG. 16, in a vehicle entry-exit assist device 280 according to the present modified example, a metal latch 282, serving as a restricting mechanism, is provided to the dividing section 222. The latch 282 restricts pivoting of the second handrail portion 228, and is formed as a single unit configured of an upper plate portion 282A covering the upper face 63 at the dividing section 222, and side plate portions 282B covering both side portions 64 at the dividing section 222. A metal shaft 284 is joined to vehicle width direction inner side end portions of the side plate portions 282B while in the in-use state. The shaft 284 is disposed so as to penetrate the first handrail portion 226 in the vehicle front-rear direction while in the in-use state. The shaft 284 is capable of being rotated with its axial direction along the vehicle front-rear direction while in the in-use state by a non-illustrated motor that is driven in conjunction with the sensor section 270. The latch 282 is capable of being pivoted about the axial direction of the shaft 284 by rotation of the shaft 284.

In the vehicle entry-exit assist device 280 according to the present modified example, when the sensor section 270 detects that the hand H of an occupant is gripping the handrail 220 while in the in-use state (see FIG. 14 and FIG. 15), the latch 282 is pivoted toward the dividing section 222 and covers the dividing section 222 from the outer side thereof, thereby restricting pivoting of the second handrail portion 228 toward the vehicle front side and vehicle rear side. Thus, an occupant gripping the handrail 220 when entering or exiting the vehicle 12 is able to grip the handrail 220 steadily, thereby enabling the occupant to steady their posture when entering or exiting the vehicle 12. Moreover, when gripping by an occupant is not being detected by the sensor section 270, the latch 282 is pivoted toward the vehicle upper side and vehicle width direction inner side while in the in-use state. Thus, if a pedestrian or a cyclist hits a side portion 64 of the second handrail portion 228, the impact received from the second handrail portion 228 can be lessened, enabling an improvement in pedestrian and cyclist safety.

Second Modified Example

Figure 17:
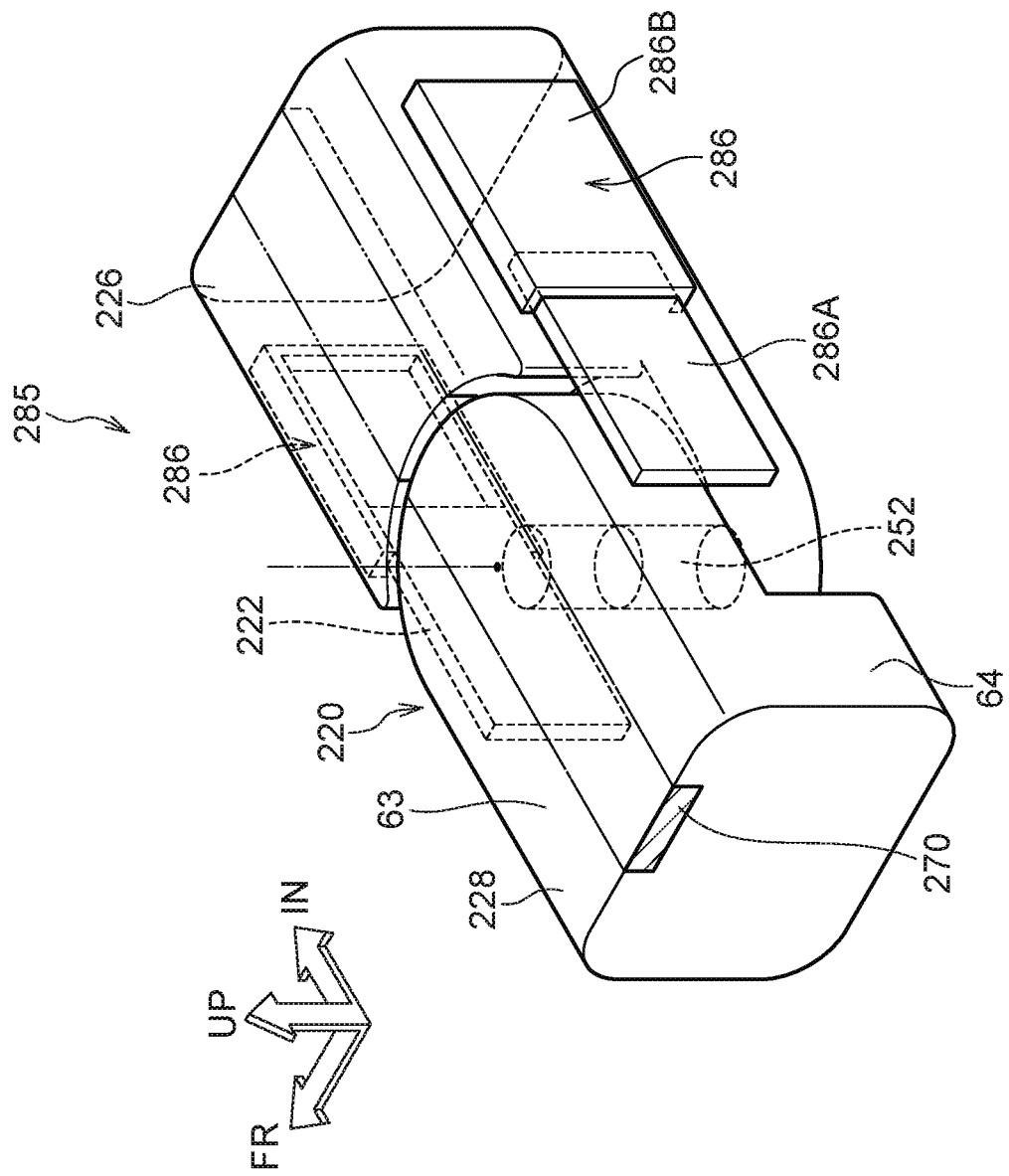
FIG. 17 is a perspective view illustrating a restricting mechanism according to a second modified example of the second exemplary embodiment.

Next, explanation follows regarding a second modified example of the present exemplary embodiment, with reference to FIG. 17. Note that configuration portions that are the same as those in the exemplary embodiment described above are appended with the same reference numerals, and explanation thereof is omitted.

As illustrated in FIG. 17, in a vehicle entry-exit assist device 285 according to the present modified example, metal sliding plate sections 286, serving as a restricting mechanism, are provided to the side portions 64 of the handrail 220. Each of the sliding plate sections 286 is configured including a sliding plate 286A and a stowing portion 286B. Each of the sliding plates 286A covers the corresponding side portion 64 of the dividing section 222 when pivoting of the second handrail portion 228 is being restricted. Each of the stowing portions 286B is provided to a side portion of the first handrail portion 226, and is formed in a hollow box shape so as to be capable of stowing the sliding plate 286A. A solenoid and plunger, not illustrated in the drawings, are disposed at a vehicle width direction inner side end portion of the stowing portion 286B while in the in-use state. The sliding plate 286A is attached to the plunger so as to be capable of sliding along a side face of the handrail 220 toward the dividing section 222. The solenoid and plunger are electrically connected to the sensor section 270, such that the sliding plate 286A is coordinated with the sensor section 270 so as to slide toward the vehicle width direction outer side while in the in-use state.

In the vehicle entry-exit assist device 285 according to the present modified example, when the sensor section 270 detects that the hand H of an occupant has gripped the handrail 220 while in the in-use state (see FIG. 14 and FIG. 15), the sliding plates 286A of the sliding plate sections 286 are slid toward the vehicle width direction outer side. Thus the side portions 64 of the dividing section 222 are covered by the sliding plates 286A, such that pivoting of the second handrail portion 228 toward the vehicle front side and vehicle rear side is restricted. Thus, an occupant gripping the handrail 220 when entering or exiting the vehicle 12 is able to grip the handrail 220 steadily, thereby enabling the occupant to steady their posture when entering or exiting the vehicle 12. Moreover, when gripping by an occupant is not being detected by the sensor section 270, the sliding plates 286A are stowed within the stowing portions 286B. Thus, if a pedestrian or a cyclist hits a side portion 64 of the second handrail portion 228, the impact received from the second handrail portion 228 can be lessened, enabling an improvement in pedestrian and cyclist safety.

Third Modified Example

Figure 18:
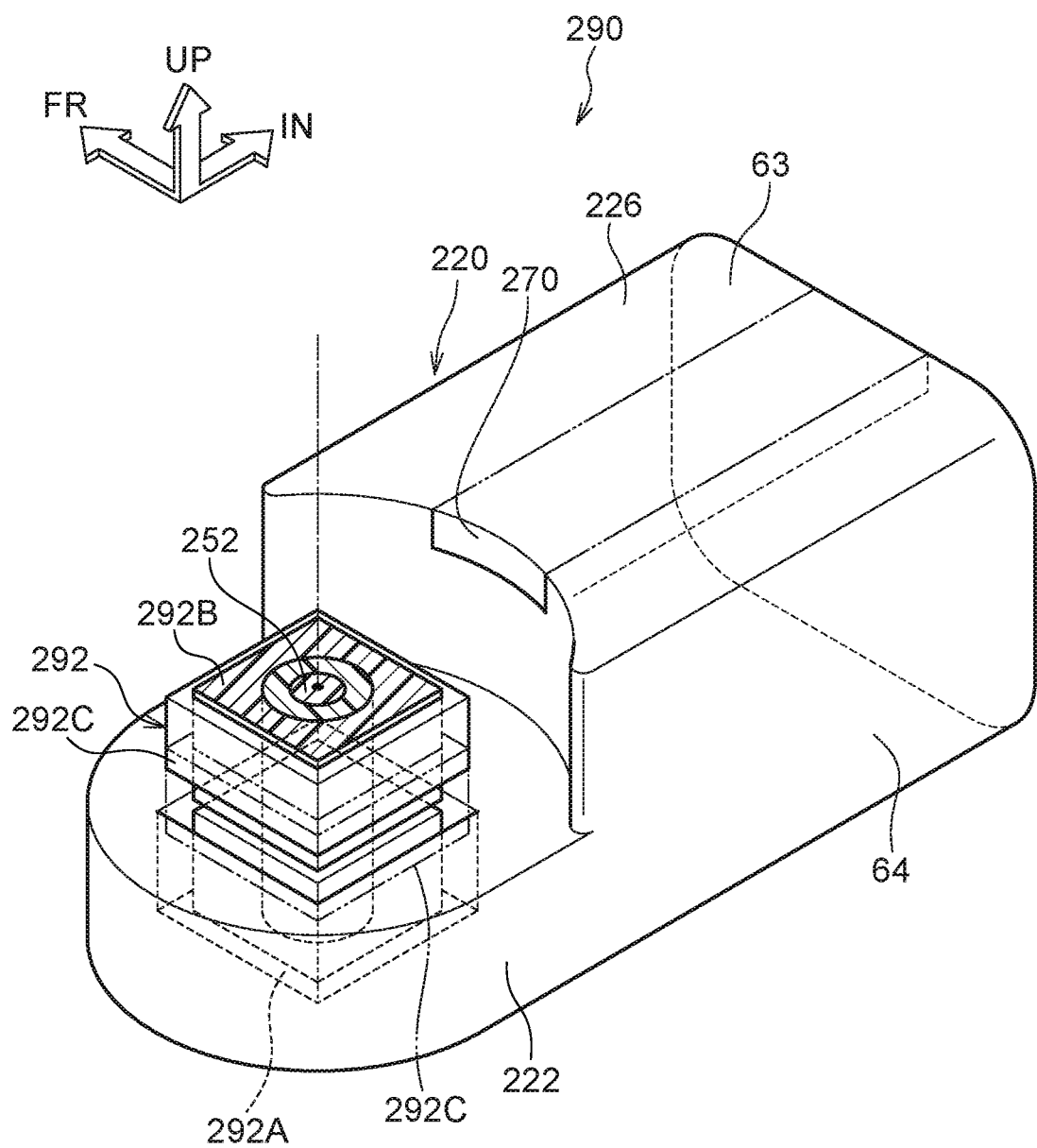
FIG. 18 is a perspective view illustrating a restricting mechanism according to a third modified example of the second exemplary embodiment.

Next, explanation follows regarding a third modified example of the present exemplary embodiment, with reference to FIG. 18. Note that configuration portions that are the same as those in the exemplary embodiment described above are appended with the same reference numerals, and explanation thereof is omitted.

As illustrated in FIG. 18, in a vehicle entry-exit assist device 290 according to the present modified example, a metal sliding outer frame unit 292, serving as a restricting mechanism, is provided at the dividing section 222. The sliding outer frame unit 292 is configured including a first solenoid portion 292A provided on the first handrail portion 226 side of the dividing section 222, a second solenoid portion 292B provided on the second handrail portion 228 side of the dividing section 222, and an outer frame 292C provided so as to follow the outer profiles of the first solenoid portion 292A and second solenoid portion 292B. The outer frame 292C is formed in a substantially rectangular tube shape so as to follow the outer profiles of the first solenoid portion 292A and second solenoid portion 292B, each of which is formed in a substantially rectangular box shape provided with a hinge pin 252 at a central portion thereof. The outer frame 292C is therefore capable of sliding along the vehicle vertical direction while in the in-use state at the outer sides of the first solenoid portion 292A and the second solenoid portion 292B. A solenoid and plunger, not illustrated in the drawings, are respectively provided to both the first solenoid portion 292A and the second solenoid portion 292B. The plungers are thus capable of sliding the outer frame 292C in the vehicle vertical direction while in the in-use state so as to follow outer portions of the first solenoid portion 292A and the second solenoid portion 292B. The solenoids and plungers are electrically connected to the sensor section 270, such that the outer frame 292C is made to slide in conjunction with the sensor section 270.

In the vehicle entry-exit assist device 290 according to the present modified example, when the sensor section 270 detects that the hand H of an occupant has gripped the handrail 220 while in the in-use state (see FIG. 14 and FIG. 15), the outer frame 292C of the sliding outer frame unit 292 slides along the vehicle vertical direction to a vehicle vertical direction substantially intermediate portion of the handrail 220 while in the in-use state (see the double-dotted dashed lines in FIG. 18). Pivoting of the second handrail portion 228 toward the vehicle front side and vehicle rear side is restricted by the outer frame 292C that has slid to the vehicle vertical direction substantially intermediate portion of the handrail 220. Thus, an occupant gripping the handrail 220 when entering or exiting the vehicle 12 is able to grip the handrail steadily, thereby enabling the occupant to steady their posture when entering or exiting the vehicle 12. Moreover, when gripping by an occupant is not being detected by the sensor section 270, the outer frame 292C is moved toward the first solenoid portion 292A side or the second solenoid portion 292B side so as to allow the second handrail portion 228 to pivot. Thus, if a pedestrian or a cyclist hits a side portion 64 of the second handrail portion 228, the impact received from the second handrail portion 228 can be lessened, enabling an improvement in pedestrian and cyclist safety.

Fourth Modified Example

Figure 19:
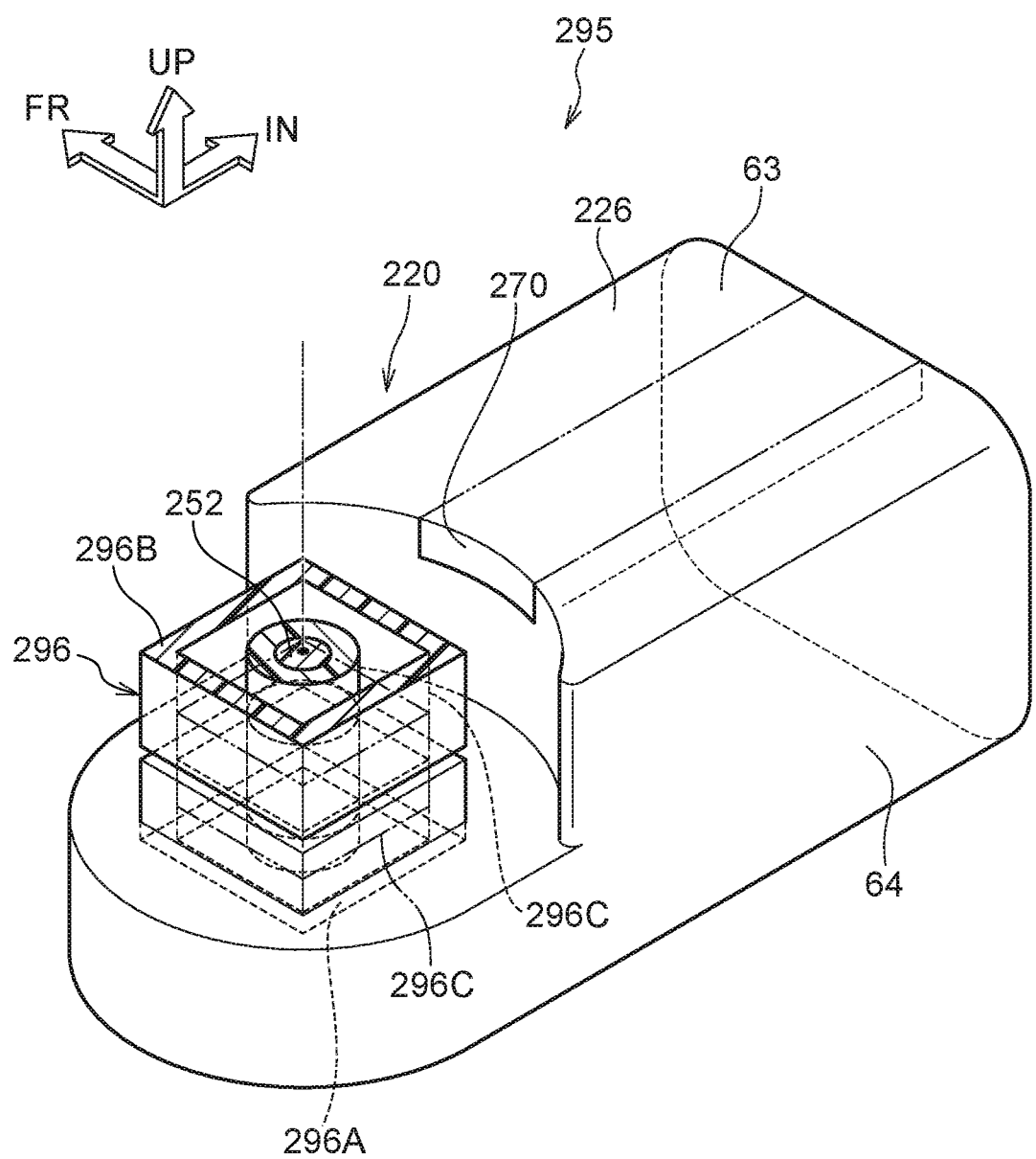
FIG. 19 is a perspective view illustrating a restricting mechanism according to a fourth modified example of the second exemplary embodiment.

Next, explanation follows regarding a fourth modified example of the present exemplary embodiment, with reference to FIG. 19. Note that configuration portions that are the same as those in the exemplary embodiment described above are appended with the same reference numerals, and explanation thereof is omitted.

As illustrated in FIG. 19, in a vehicle entry-exit assist device 295 according to the present modified example, a metal sliding inner frame unit 296, serving as restricting mechanism, is provided at the dividing section 222. The sliding inner frame unit 296 is configured including a third solenoid portion 296A provided on the first handrail portion 226 side of the dividing section 222, a fourth solenoid portion 296B provided on the second handrail portion 228 side of the dividing section 222, and an inner frame 296C formed at the inner sides of the third solenoid portion 296A and the fourth solenoid portion 296B. The inner frame 296C is formed in a substantially rectangular box shape so as to follow the inner profiles of the third solenoid portion 296A and the fourth solenoid portion 296B, each of which is formed in a substantially rectangular tube shape, and includes a hinge pin 252 at a central portion thereof. The inner frame 296C is therefore capable of sliding along the vehicle vertical direction while in the in-use state at the inner sides of the third solenoid portion 296A and the fourth solenoid portion 296B. A solenoid and plunger, not illustrated in the drawings, are respectively provided to both the third solenoid portion 296A and the fourth solenoid portion 296B. The plungers are capable of sliding the inner frame 296C in the vehicle vertical direction while in the in-use state along the inner sides of the third solenoid portion 296A and the fourth solenoid portion 296B. The solenoids and plungers are electrically connected to the sensor section 270, such that the inner frame 296C is made to slide in conjunction with the sensor section 270.

In the vehicle entry-exit assist device 295 according to the present modified example, when the sensor section 270 detects that the hand 11 of an occupant has gripped the handrail 220 while in the in-use state (see FIG. 14 and FIG. 15), the inner frame 296C of the sliding inner frame unit 296 slides along the vehicle vertical direction to a vehicle vertical direction substantially intermediate portion of the handrail 220 while in the in-use state (see the double-dotted dashed lines in FIG. 19). Pivoting of the second handrail portion 228 toward the vehicle front side and vehicle rear side is restricted by the inner frame 296C that has slid to the vehicle vertical direction substantially intermediate portion of the handrail 220. Thus, an occupant gripping the handrail 220 when entering or exiting the vehicle 12 is able to grip the handrail 220 steadily, thereby enabling the occupant to steady their posture when entering or exiting the vehicle 12. Moreover, when gripping by an occupant is not being detected by the sensor section 270, the inner frame 296C is moved toward the third solenoid portion 296A side or the fourth solenoid portion 296B side, allowing the second handrail portion 228 to pivot. Thus, if a pedestrian or a cyclist hits a side portion 64 of the second handrail portion 228, the impact received from the second handrail portion 228 can be lessened, enabling an improvement in pedestrian and cyclist safety.

Third Exemplary Embodiment

Figure 20:
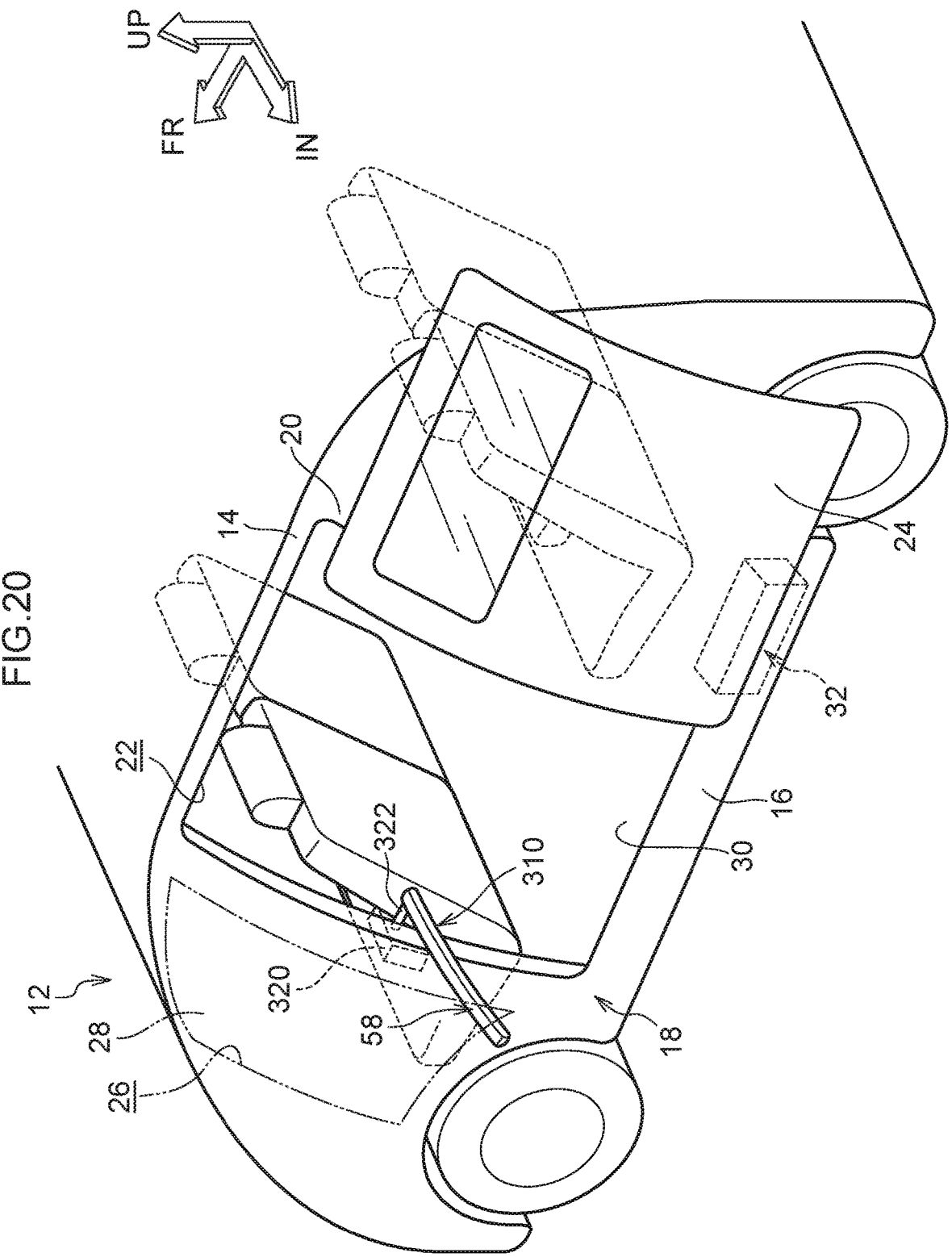
FIG. 20 is a perspective view illustrating a vehicle provided with a vehicle entry-exit assist device according to a third exemplary embodiment, as viewed from a rear-left side.

Explanation follows regarding a vehicle entry-exit assist device 310 according to a third exemplary embodiment of the present invention, with reference to FIG. 20. Note that configuration portions that are the same as those in the first exemplary embodiment described above are appended with the same reference numerals, and explanation thereof is omitted.

As illustrated in FIG. 20, in the vehicle entry-exit assist device 310 according to the third exemplary embodiment, the handrail 58 is attached to a pivot mechanism 320 provided to a vehicle inner side edge of a vehicle front side end portion of the rear door opening 22. A substantially circular column shaped drive shaft 322 running along the vehicle front-rear direction is attached to the pivot mechanism 320. The drive shaft 322 is capable of being rotated about its axis by a small motor (not illustrated in the drawings) provided within the pivot mechanism 320. The handrail 58 is attached to the drive shaft 322 so as to be capable of being pivoted about the axis of the drive shaft 322. Note that although explanation has been given here in which the drive shaft 322 is capable of being rotated by a small motor, there is no limitation thereto. Biasing force of a spring or the like provided within a pivot mechanism may cause a drive shaft to rotate when a push button provided to an outer side of the pivot mechanism is pressed.

Operation and Advantageous Effects

Explanation follows regarding operation and advantageous effects of the present exemplary embodiment.

In the vehicle entry-exit assist device 310 according to the present exemplary embodiment, the handrail 58 is attached to the pivot mechanism 320 so as to be capable of pivoting about an axis along the vehicle front-rear direction, and the pivot mechanism 320 is provided at the vehicle inner side edge of the rear door opening 22. Thus, only the handrail 58 is disposed in the vehicle interior when the sliding door 24 has been closed, enabling a reduction in the vehicle interior space for an occupant to be suppressed. This enables a reduction in the vehicle interior space for an occupant to be suppressed, enabling even more vehicle interior space for the occupant to be secured in a case in which the door has been closed.

Note that although explanation has been given here in which the vehicle entry-exit assist device 10, 110, 160, 210, 280, 285, 290, 295, 310 is provided to the vehicle front side end portion of the rear door opening 22, there is no limitation thereto, and a vehicle entry-exit assist device may be provided to a vehicle rear side end portion of a rear door opening.

Note that although explanation has been given here in which the pivot mechanism 70 is actuated in conjunction with the electric power unit 32 of the sliding door 24, there is no limitation thereto. A pivot mechanism that is separate to an opening-closing mechanism may be actuated by providing a member with biasing force such as a spring to the pivot mechanism, and providing a push button or the like that is coordinated with the pivot mechanism to a support column.

What is claimed is:

1. A vehicle entry-exit assist device comprising:
   a support column along a vehicle vertical direction at a vehicle inner side of a vehicle front side end portion or a vehicle rear side end portion of a door opening at a side section of a vehicle, wherein the door opening is configured to permit an occupant to move between the vehicle inner side and a vehicle outer side;
   a handrail connected to the support column, wherein the handrail is capable of pivoting toward the vehicle outer side and a vehicle upper side about an axis along a vehicle front-rear direction in a case in which a door at the door opening is open, and the handrail is configured to be stowed along the support column in a case in which the door is closed; and
   a pivot mechanism connected to at the support column and that is configured to pivot the handrail, wherein the handrail includes:
      a dividing section that divides the handrail into a vehicle width direction inner side portion and a vehicle width direction outer side portion while in an in-use state in which the handrail has been pivoted toward the vehicle outer side and the vehicle upper side;
      a first handrail portion that extends from the dividing section to a vehicle width direction inner side end portion of the handrail;
      a second handrail portion that extends from the dividing section to a vehicle width direction outer side end portion of the handrail, and that is coupled to the first handrail portion at the dividing section so as to be capable of pivoting toward the vehicle front side and the vehicle rear side about an axis along the vehicle vertical direction while in the in-use state;
      a sensor section along a length direction of the handrail at an upper face of the handrail while in the in-use state, and that is configured to detect gripping of the handrail by the occupant; and
      a restricting mechanism that operates in conjunction with the sensor section to restrict pivoting of the second handrail portion toward the vehicle front side and the vehicle rear side in a case in which gripping of the handrail by the occupant has been detected by the sensor section.

2. The vehicle entry-exit assist device of claim 1, wherein the pivot mechanism is driven by an opening-closing mechanism of the door so as to pivot the handrail in conjunction with opening and closing of the door.

3. The vehicle entry-exit assist device of claim 1, wherein the sensor section includes an electrostatic sensor configured to detect a state in which a hand of the occupant has made contact with the upper face, or a state in which a hand of the occupant is proximate to the upper face.

4. A vehicle entry-exit assist device comprising:
   a pivot mechanism at a vehicle inner side edge of a vehicle front side end portion or a vehicle rear side end portion of a door opening at a side section of a vehicle, wherein the door opening is configured to permit an occupant to move between the vehicle inner side and a vehicle outer side, and the pivot mechanism includes a drive shaft capable of rotating about an axis along a vehicle front-rear direction; and
   a handrail that is attached to the drive shaft, wherein the handrail is capable of pivoting toward the vehicle outer side and a vehicle upper side about an axis along the vehicle front-rear direction in a case in which a door at the door opening is open, and the handrail is configured to be stowed along a vehicle vertical direction at the vehicle inner side in a case in which the door is closed, wherein
   the handrail includes:
      a dividing section that divides the handrail into a vehicle width direction inner side portion and a vehicle width direction outer side portion while in an in-use state in which the handrail has been pivoted toward the vehicle outer side and the vehicle upper side;
      a first handrail portion that extends from the dividing section to a vehicle width direction inner side end portion of the handrail;
      a second handrail portion that extends from the dividing section to a vehicle width direction outer side end portion of the handrail, and that is coupled to the first handrail portion at the dividing section so as to be capable of pivoting toward the vehicle front side and the vehicle rear side about an axis along the vehicle vertical direction while in the in-use state;
      a sensor section along a length direction of the handrail at an upper face of the handrail while in the in-use state, and that is configured to detect gripping of the handrail by the occupant; and
      a restricting mechanism that operates in conjunction with the sensor section to restrict pivoting of the second handrail portion toward the vehicle front side and the vehicle rear side in a case in which gripping of the handrail by the occupant has been detected by the sensor section.

5. The vehicle entry-exit assist device of claim 4, wherein the pivot mechanism is driven by an opening-closing mechanism of the door so as to pivot the handrail in conjunction with opening and closing of the door.

6. The vehicle entry-exit assist device of claim 4, wherein the sensor section includes an electrostatic sensor configured to detect a state in which a hand of the occupant has made contact with the upper face, or a state in which a hand of the occupant is proximate to the upper face.

7. The vehicle entry-exit assist device of claim 1, wherein the handrail comprises a portion to be gripped by an occupant, wherein the portion is capable of pivoting toward the vehicle outer side and the vehicle upper side about the axis along the vehicle front-rear direction.

8. The vehicle entry-exit assist device of claim 4, wherein the handrail comprises a portion to be gripped by the occupant, wherein the portion is capable of pivoting toward the vehicle outer side and the vehicle upper side about the axis along the vehicle front-rear direction.

\* \* \* \* \*